United States Patent
Takagi et al.

(10) Patent No.: US 8,804,190 B2
(45) Date of Patent: Aug. 12, 2014

(54) IMAGE PROCESSING METHOD, IMAGE PROCESSING PROGRAM, AND INFORMATION PROCESSING APPARATUS

(75) Inventors: Yasunobu Takagi, Kanagawa (JP); Toshihito Kamei, Tokyo (JP); Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 183 days.

(21) Appl. No.: 13/569,765

(22) Filed: Aug. 8, 2012

(65) Prior Publication Data

US 2013/0057879 A1    Mar. 7, 2013

(30) Foreign Application Priority Data

Sep. 5, 2011    (JP) .................................. 2011-193044

(51) Int. Cl.

| | | |
|---|---|---|
| G06F 15/00 | (2006.01) | |
| G06K 1/00 | (2006.01) | |
| H04N 1/40 | (2006.01) | |
| H04N 1/405 | (2006.01) | |
| G06T 5/00 | (2006.01) | |
| G06F 17/21 | (2006.01) | |
| G06F 17/22 | (2006.01) | |
| G06F 17/24 | (2006.01) | |
| B41J 2/165 | (2006.01) | |
| B41J 2/045 | (2006.01) | |

(52) U.S. Cl.
CPC ......... *G06T 5/00* (2013.01); *G06T 2207/10024* (2013.01); *G06F 17/212* (2013.01); *G06F 17/2247* (2013.01); *G06F 17/24* (2013.01); *B41J 2/16579* (2013.01); *B41J 2/04581* (2013.01); *B41J 2/0459* (2013.01); *B41J 2/04591* (2013.01); *B41J 2/04595* (2013.01)
USPC .......... 358/1.8; 358/3.06; 358/3.01; 382/274; 382/169; 347/14; 347/15; 347/19

(58) Field of Classification Search
None
See application file for complete search history.

(56) References Cited

U.S. PATENT DOCUMENTS

| | | | |
|---|---|---|---|
| 5,729,625 A * | 3/1998 | Miyake | 382/169 |
| 2005/0200900 A1 * | 9/2005 | Hirano | 358/3.06 |
| 2007/0195372 A1 * | 8/2007 | Ishii et al. | 358/3.06 |
| 2008/0117467 A1 | 5/2008 | Hosaka et al. | |
| 2010/0053194 A1 * | 3/2010 | Nakamura et al. | 345/589 |
| 2010/0182366 A1 | 7/2010 | Takagi et al. | |
| 2012/0026553 A1 * | 2/2012 | Ozawa et al. | 358/3.01 |
| 2012/0147078 A1 | 6/2012 | Takagi et al. | |
| 2012/0147082 A1 | 6/2012 | Takagi et al. | |

FOREIGN PATENT DOCUMENTS

| | | |
|---|---|---|
| JP | 2004-230672 | 8/2004 |
| JP | 2004-304543 | 10/2004 |
| JP | 2007-049443 | 2/2007 |
| JP | 2008-126453 | 6/2008 |
| JP | 2009-171014 | 7/2009 |
| JP | 2010-215399 | 9/2010 |

* cited by examiner

*Primary Examiner* — Satwant Singh
(74) *Attorney, Agent, or Firm* — Harness, Dickey & Pierce, P.L.C.

(57) ABSTRACT

A method including the steps of obtaining an original image, generating a converted image by converting a gradation of a pixel of the original image into a prescribed gradations for an image forming apparatus to express, outputting a dot pattern image through a nozzle based on a predetermined dot pattern signal, generating nozzle characteristic information of the nozzle based on the dot pattern image, generating simulation information based on the converted image and the nozzle characteristic information, generating converted simulation information by converting the simulation information to the same gradation as that of the pixel of the original image, comparing the converted simulation information with the original image, and calculating an error between the original image and the converted simulation information.

20 Claims, 14 Drawing Sheets

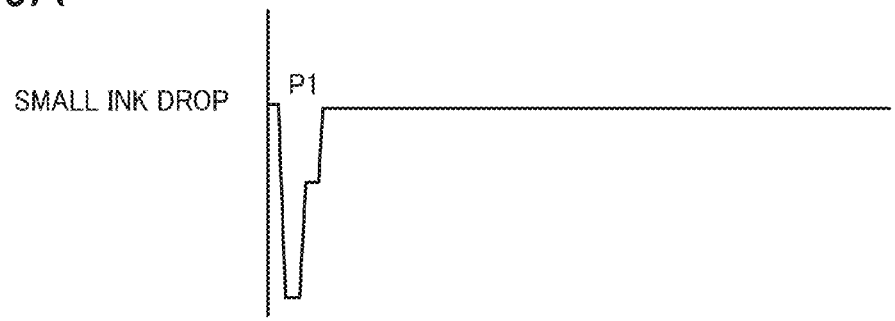
FIG. 9A SMALL INK DROP
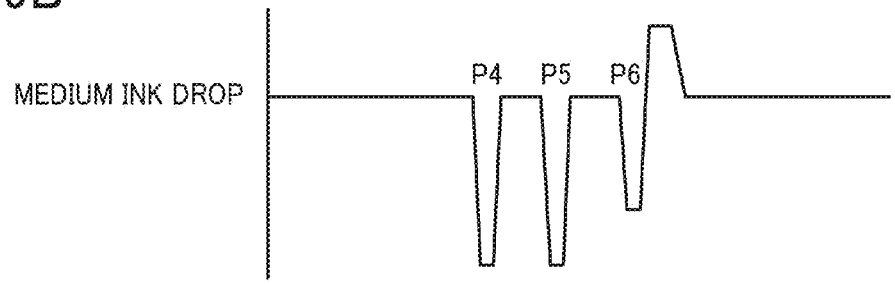
FIG. 9B MEDIUM INK DROP
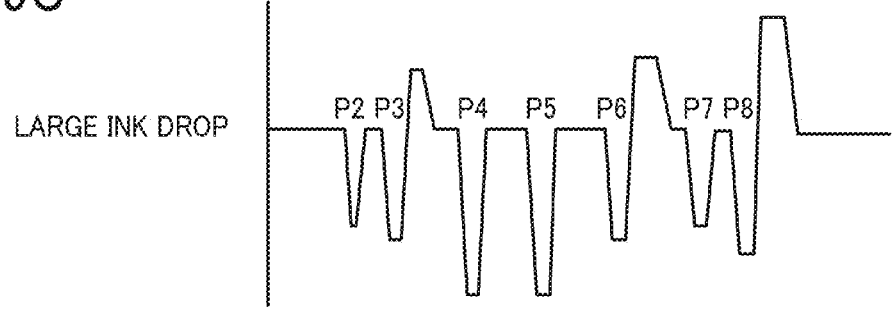
FIG. 9C LARGE INK DROP
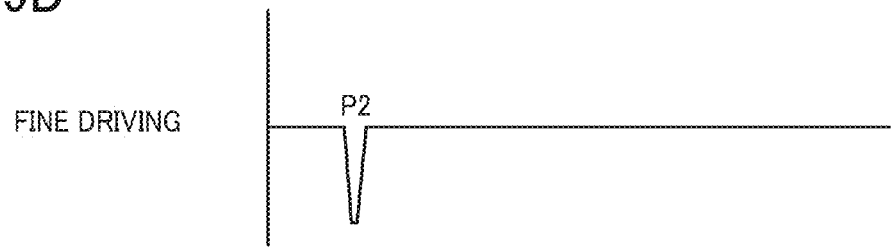
FIG. 9D FINE DRIVING

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

PROCESSING IN
RASTER ORDER

| 1 | 2 | 3 | 4 | 5 |
|---|---|---|---|---|
| 2 | 3 | 4 | 5 | 6 |
| 3 | 4 | 5 | 6 | 7 |
| 4 | 5 | 6 | 7 | 8 |
| 5 | 6 | 7 | 8 | 9 |

START FROM LEFT
UPPER SIDE

| 5 | 4 | 3 | 4 | 5 |
|---|---|---|---|---|
| 4 | 3 | 2 | 3 | 4 |
| 3 | 2 | 1 | 2 | 3 |
| 4 | 3 | 2 | 3 | 4 |
| 5 | 4 | 3 | 4 | 5 |

START FROM
CENTER

| 1 | 2 | 1 | 2 | 1 |
|---|---|---|---|---|
| 2 | 1 | 2 | 1 | 2 |
| 1 | 2 | 1 | 2 | 1 |
| 2 | 1 | 2 | 1 | 2 |
| 1 | 2 | 1 | 2 | 1 |

BAYER STATE ①

| 1 | 2 | 3 | 2 | 1 |
|---|---|---|---|---|
| 2 | 3 | 2 | 3 | 2 |
| 3 | 2 | 1 | 2 | 3 |
| 2 | 3 | 2 | 3 | 2 |
| 1 | 2 | 3 | 2 | 1 |

BAYER STATE ②

DOT PATTERN AFTER HALFTONE PROCESS    SIMULATION OF INK DROP LANDING

DOT PATTERN AFTER HALFTONE PROCESS    SIMULATION OF INK DROP LANDING

IMAGE PROCESSING METHOD, IMAGE PROCESSING PROGRAM, AND INFORMATION PROCESSING APPARATUS

CROSS-REFERENCE TO RELATED APPLICATION

This patent application is based on and claims priority pursuant to 35 U.S.C. §119 to Japanese Patent Application No. 2011-193044, filed on Sep. 5, 2011 in the Japan Patent Office, the entire disclosure of which is hereby incorporated by reference herein.

BACKGROUND OF THE INVENTION

1. Field of the Invention

The present invention relates to an image processing method, image processing program, and an information processing system, and in particular to image processing executed when an ink-jet printing head forms and outputs an image.

2. Description of the Background Art

In recent years, conversion of information to digital electronic format has accelerated, and accordingly, a printer, a facsimile, and an image processing system, such as a scanner, etc., which digitalizes and outputs an image of a document, have become indispensable. Increasingly, these image processing systems are that are used as copiers, printers, facsimile machines, and scanners or the like, and equipped with imaging, image formation, and communications capabilities, etc. In recent years, conversion of information to digital electronic format has accelerated, and accordingly, a printer, a facsimile, and an image processing system, such as a scanner, etc., which digitalizes and outputs an image of a document, have become indispensable. These image processing systems frequently constitute a multiple-functional machine used as a copier, a printer, a facsimile, and a scanner or the like including imaging, image formation, and communication capabilities, etc.

As one example of such an image processing system used to output digitalized information in this way, there is a type of printer that employs an ink-jet method (hereinafter, simply referred to as an ink-jet printer) and includes one or more printing heads provided with ink ejection nozzles. The ink-jet printer applies pressure to an ink liquid chamber disposed in the printing head using a PZT ($PbZrO_3$—$PbTiO_3$) element or a heating element, etc., and ejects ink droplets from the nozzles in the head onto a printing medium, thereby performing image formation.

The ink-jet printer executes image formation by ejecting ink at each pixel constituting an image, based on image data converted to a given resolution. Depending on the specifications thereof, the ink-jet printer may be one that represents each pixel with only a single gradation and distinguishes only between color and colorless, or one that represents each pixel by three gradations of heavy, normal, and light in addition to colorless.

By contrast, each pixel of image data used to generate an output image generally has multiple gradations that exceed the ability of an ink-jet printer to express them. Therefore, when an image is formed and outputted by the ink-jet printer, the original image data that is expressed in multiple gradations is converted into gradations adapted to the capabilities of the ink-jet printer, and halftone processing is carried out so as not to degrade the quality of the image when viewed.

As an example of halftone processing, an error diffusion method and a dither method are known. In addition, a DBS (Direct Binary Search) technique that directly seeks out error and processes it has also come to be used in recent years, as typified by Japanese Patent Application Publication No. 2010-215399 (JP-2010-215399-A).

However, there is a problem with the ink-jet printer in that an image is not always formed as intended due to inconsistency in the performance of ink ejected and settled on a sheet (hereinafter, simply referred to as ink droplet landing performance). As used herein, the term "droplet landing performance" includes but is not limited to size, position, shape, etc., of the droplets of ink ejected from the nozzles in the printing head.

To solve problems caused by this kind of variation in droplet landing performance, a method of halftone processing has been proposed that substantially reduces a driving frequency when discharging either droplets having a size causing uneven ejection from the nozzles or nozzles exhibiting uneven ejection, as described in JP-2008-126453-A. An added complication is that, in recent years, a line-type ink-jet printer employing multiple heads arrayed in a lengthwise direction is sometimes used for improved productivity, because a wide image can be formed at a single scan.

However, since such a wide image formed all at once requires the use of many nozzles, the problem of the above-described variation in droplet landing performance is exacerbated. More specifically, because the image needs to be outputted in a single scan, the nozzles aligned on each scanning line are necessarily densely packed, and accordingly a variation in droplet landing performance between the nozzles more easily degrades the quality of the image.

Although halftone processing is performed in accordance with the droplet landing performance as described in the method of JP-2008-126453-A, a reduction of the driving frequency of a driving waveform tends to result in a blurred output image.

BRIEF SUMMARY OF THE INVENTION

Accordingly, the present invention provides a novel image processing method comprising the steps of obtaining an original image, storing the original image in a storage medium, and converting a gradation of a pixel constituting the original image stored in the storage medium in different manners to generate converted original images be expressed by the image forming apparatus. The method further comprises the steps of outputting a dot pattern image through the nozzle of the image forming apparatus based on a predetermined dot pattern signal, generating nozzle characteristic information indicating a characteristic of the nozzle based on the dot pattern image, and outputting multiple sets of simulation information based on the converted original images and the nozzle characteristic information. The method further comprises the subsequent steps of storing the multiple sets of simulation information in a storage medium, generating converted simulation information by converting gradation of a pixel of the multiple sets of the simulation information to the same level as the original image, and comparing the multiple sets of the converted simulation information with the original image. The steps further included are calculating a conversion error between the original image and the multiple sets of the converted simulation information, storing the conversion error in a storage medium, and specifying one of the converted original images as drawing information based on the conversion error to cause the image forming apparatus to form the image by ejecting an ink droplet.

In another aspect of the present invention, the method further comprises the steps generating nozzle characteristic information is executed by comparing the prescribed dot pattern signal with the dot pattern image information stored in the memory.

In yet another aspect of the present invention, he method further comprises the step of storing the multiple sets of simulation information in a storage medium is executed when a difference between currently and previously generated nozzle characteristic information exceeds a given threshold.

In yet another aspect of the present invention, the nozzle characteristic information includes at least one of a position of an ink droplet, a size of the ink droplet, a shape of the ink droplet, and distribution of a plurality of ink droplets ejected onto the printing medium from the nozzle based on the drawing information per pixel.

In yet another aspect of the present invention, wherein each of the multiple sets of simulation information includes distribution of a plurality of ink droplets outputted based on the converted pixel gradation, wherein gradation of a pixel of the simulation information is calculated based on an ink covering amount per pixel with reference to the ink distribution information when converted into the same gradation level as the original image.

In yet another aspect of the present invention, the nozzle characteristic information includes a variable operating condition of the image forming apparatus.

In yet another aspect of the present invention, all of the steps are executed per divisional region of the original image.

In yet another aspect of the present invention, the image processing method further comprising the steps of: assigning a priority order to the divisional regions, calculating the conversion error in the priority order assigned to the divisional regions, determining the drawing information for one of the divisional regions based on a result of the conversion error calculation, and determining drawing information for another region adjacent to the one of the divisional regions with reference to a result of the simulation executed for the one of the divisional regions.

In yet another aspect of the present invention, a computer readable medium storing thereon program code causing a computer to perform the steps of obtaining an original image, storing the original image in a storage medium, and converting a gradation of a pixel constituting the original image stored in the storage medium in different manners to generate converted original images be expressed by the image forming apparatus. The method further comprises the steps of outputting a dot pattern image through the nozzle of the image forming apparatus based on a predetermined dot pattern signal, generating nozzle characteristic information indicating a characteristic of the nozzle based on the dot pattern image, and outputting multiple sets of simulation information based on the converted original images and the nozzle characteristic information. The method further comprises the subsequent steps of storing the multiple sets of simulation information in a storage medium, generating converted simulation information by converting gradation of a pixel of the multiple sets of the simulation information to the same level as the original image, and comparing the multiple sets of the converted simulation information with the original image. The steps further included are calculating a conversion error between the original image and the multiple sets of the converted simulation information, storing the conversion error in a storage medium, and specifying one of the converted original images as drawing information based on the conversion error to cause the image forming apparatus to form the image by ejecting an ink droplet.

In yet another aspect of the present invention, an information processing apparatus comprises means for obtaining an original image, means for storing the original image in a storage medium, and means for converting a gradation of a pixel constituting the original image stored in the storage medium in different manners to generate converted original images be expressed by the image forming apparatus. The information processing apparatus further comprises means for outputting a dot pattern image through the nozzle of the image forming apparatus based on a predetermined dot pattern signal, means for generating nozzle characteristic information indicating a characteristic of the nozzle based on the dot pattern image, and means for outputting multiple sets of simulation information based on the converted original images and the nozzle characteristic information. The information processing apparatus further comprises means for storing the multiple sets of simulation information in a storage medium, means for generating converted simulation information by converting gradation of a pixel of the multiple sets of the simulation information to the same level as the original image, and means for comparing the multiple sets of the converted simulation information with the original image. The information processing apparatus further includes means for calculating a conversion error between the original image and the multiple sets of the converted simulation information, means for storing the conversion error in a storage medium, and means for specifying one of the converted original images as drawing information based on the conversion error to cause the image forming apparatus to form the image by ejecting an ink droplet.

BRIEF DESCRIPTION OF THE DRAWINGS

A more complete appreciation of the present invention and many of the attendant advantages thereof will be more readily obtained as the same becomes better understood by reference to the following detailed description when considered in connection with the accompanying drawings, wherein:

FIGS. 9A to 9D are diagrams illustrating other driving signals of the head driver according to one embodiment of the present invention;

DETAILED DESCRIPTION OF THE INVENTION

Figure 1:
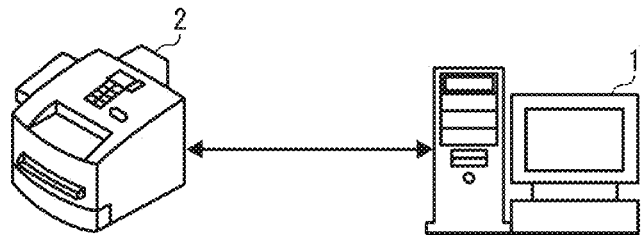
FIG. 1 is a diagram showing an operational aspect of an image forming apparatus and an information processing system according to one embodiment of the present invention.

Referring now to the drawings, wherein like reference numerals designate identical or corresponding parts throughout the several views thereof and in particular to FIG. 1, operations of an information processing system 1 and an image formation apparatus 2 are described according to one embodiment of the present invention, wherein unique processing is executed in a printer driver installed in an information processing system to control an image forming apparatus adopting an inkjet printing system to form an image. Specifically, an image can be formed in accordance with performance of an engine for forming the image.

As shown, the image formation device 2 and the information processing system 1 are connected to each other through a network to operate. As specific examples of the information processing system 1 and the image forming device 2, a general information processing terminal, such as a PC (Personal Computer), etc., and an ink-jet printer used at home, etc., can be exemplified, respectively. Otherwise, the image forming apparatus 2 can be a printing press used in commercial printing. Further, the information processing system 1 can be an information processing terminal for controlling a commercial printing presses or the like.

The information processing system 1 is a general purpose information processing system, such as PC, etc. A software program is installed in the information processing system 1 to constitute a printer driver that executes a function to cause the image forming device 2 to form an image. The function achieved by the printer driver is an essence in this embodiment.

Figure 2:
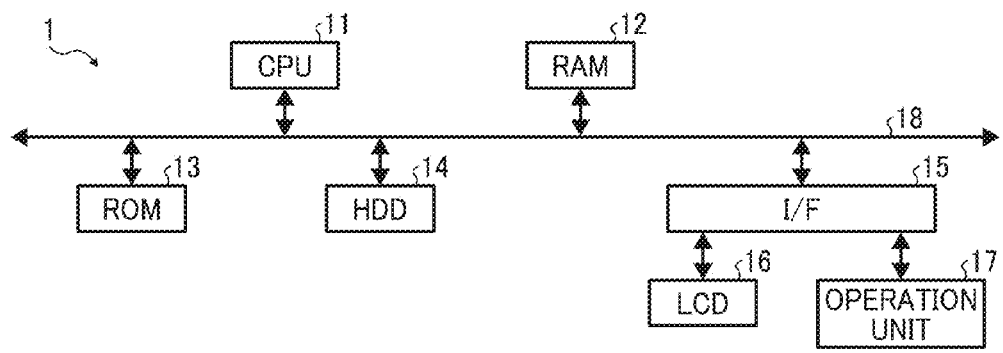
FIG. 2 is a diagram that illustrates hardware of the information processing system according to one embodiment of the present invention.

Now, a hardware configuration of the information processing system 1 according to one embodiment is described with reference to FIG. 2. As shown in FIG. 2, the information processing system 1 according to one embodiment includes a system similar to a general server and a PC or the like. Specifically, to the information processing system 1, a RAM (Random Access Memory) 12, a CPU (Central Processing Unit) 11, a ROM (Read Only Memory) 13, a HDD (Hard Disk Drive) 14, and an I/F 15 are connected via a bus 18. Further, an LCD (Liquid Crystal Display) 16 and an operation unit 17 are connected to the I/F 15.

The CPU 11 is a device to generally control an operation and the information processing system 1. The RAM 12 is a volatile storage medium capable of reading and writing information at high speed and is used as a work area where the CPU 11 processes the information. The ROM 13 is a read-only nonvolatile storage media and stores programs, such as firmware, etc. The HDD 14 is a nonvolatile storage medium again that can read and write information and stores an OS (Operating System), various control programs, and application programs or the like. Software program constituting the above-described printer driver is also stored in the HDD 14.

The I/F 15 connects the bus 18 with various hardware and a network, etc., to control those. The LCD 16 is a visual user interface for a user to check a status of the information processing system 1. The operation unit 17 is a user interface again, such as a mouse, a keyboard, etc., and is provided for a user to enter information into the information processing system 1.

Programs stored in a storage media, such as the ROM 13, the HDD 14, an optical disc, not shown, etc., are read in the RAM 12 in this hardware system. Subsequently, when the CPU 11 executes calculation in accordance with those programs, a software control unit is established. Thus, functionality of the information processing system 1 according to this embodiment is realized by a combination of the hardware and the software control unit established in this way.

Now, a functional configuration of the information processing system 1 according to one embodiment is described with reference to FIG. 3. As shown, the information processing system 1 includes a controller 100 and an external I/F 103. The external I/F 103 serves as an interface for the information processing system 1 to communicate information with an image formation apparatus 2 using Ethernet (Registered Trade Mark) and a USB (Universal Serial Bus) or the like.

The controller 100 serves as the software control unit configured by the above-described manner and includes an application 101, a communication control unit 102, and a printer driver 110. The application 101 is software realizing functionalities of browsing and editing document and image data, etc.

The application 101 outputs an instruction of printing of image or document data or the like on the way of editing or viewing in accordance with an operation of a user. The communication control unit 102 does processing for the controller 100 to communicate information with the image formation apparatus 2 via the external I/F 103.

The printer driver 110 is a gist of a system of the one embodiment of the present invention and generates drawing information for operating the image formation device 2 to output an image upon receiving a printing instruction from the application 101. At this moment, the printer driver 110 generates the drawing information in accordance with a performance of an image formation mechanism included in the image forming apparatus 2 to form a highly accurate image as intended. This process is again a gist of the one embodiment.

Figure 3:
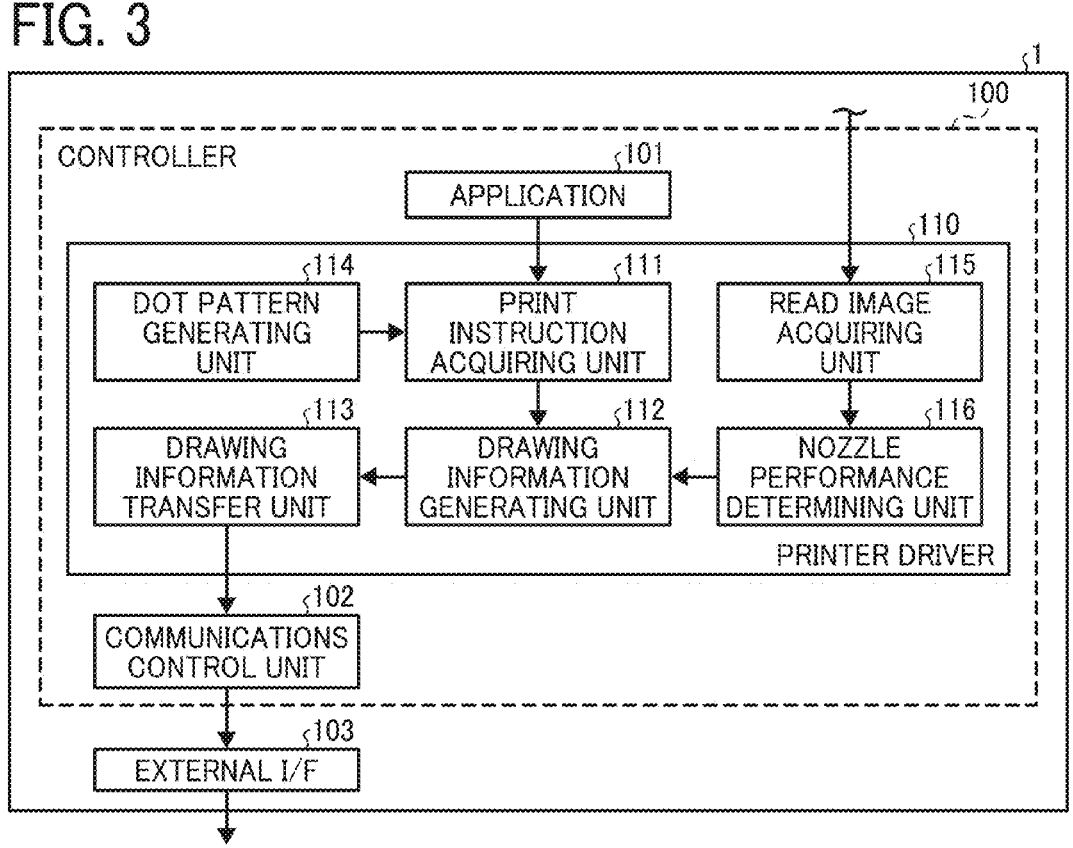
FIG. 3 is a diagram illustrating a functional configuration of the information processing system according to one embodiment of the present invention.

As shown in FIG. 3, the printer driver 110 according to this embodiment includes a printing instruction acquisition unit 111, a drawing information generation unit 112, a drawing information transfer unit 113, a dot pattern generation unit 114, a read image acquisition unit 115, and a nozzle performance judgment unit 116. A function of the printer driver 110 is described later in detail.

Figure 4:
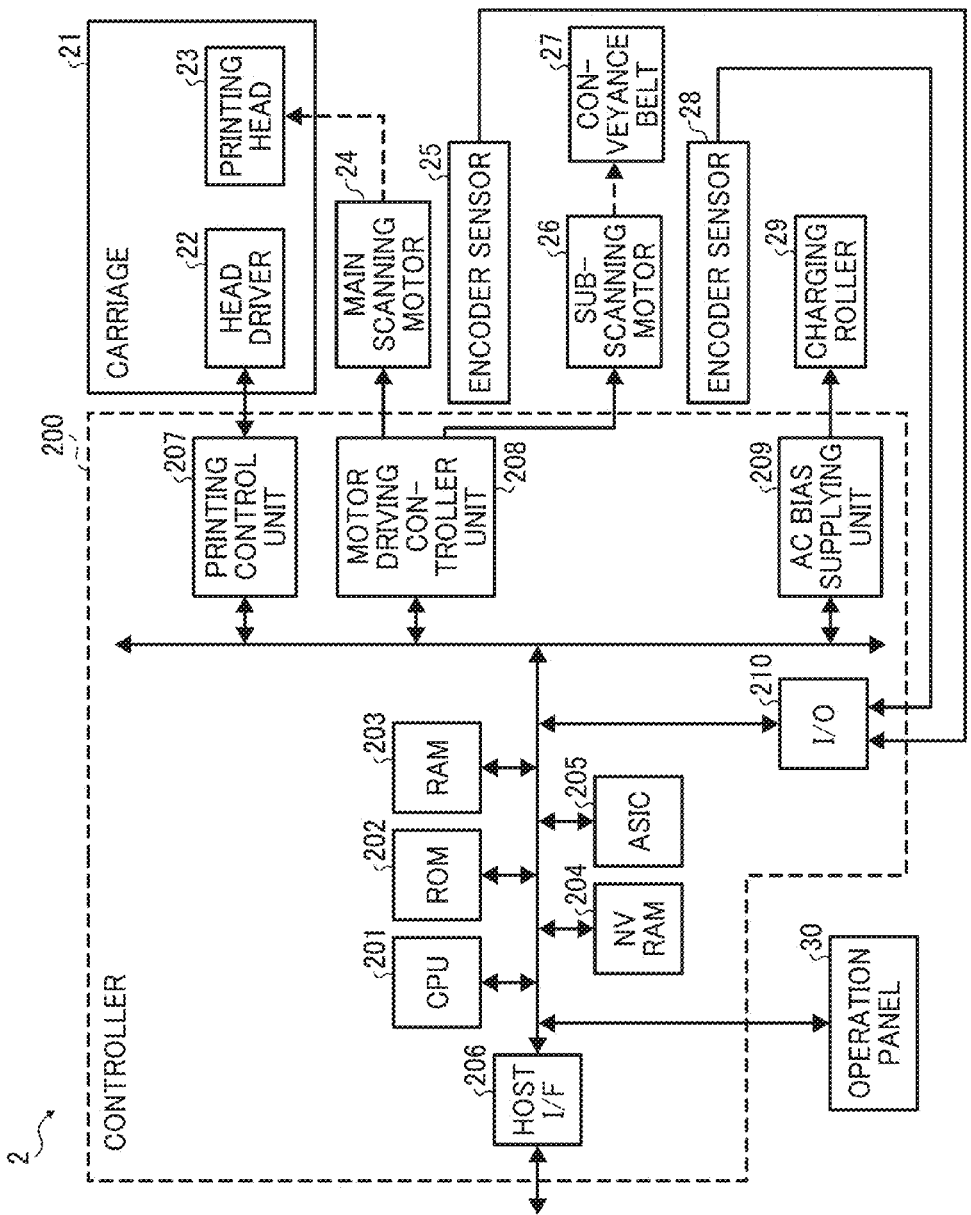
FIG. 4 is a diagram illustrating a functional system of an image forming apparatus according to one embodiment of the present invention.

The image formation device 2 includes an inkjet type image formation mechanism and outputs an image in accordance with the drawing information inputted from the information processing system 1. Now, with reference to FIG. 4, a functional system of the image formation apparatus 2 according to the one embodiment is described. As shown in FIG. 4, the image formation apparatus 2 includes a controller 200, an operation panel 30, a carriage 21, a main scanning motor 24, a sub-scanning motor 26, a conveyor belt 27, and an electric charging roller 29.

The operation panel 30 is a user interface that acts as an operation unit and a display unit for inputting and displaying necessary information in the image formation apparatus 1, respectively. A printing head 23 that ejects ink and a head driver 22 that drives the printing head 23 are integrated on the carriage 21. The carriage 21 thus ejects ink onto a front side of a sheet transported by a conveyor belt 27 when moved to the main scanning direction transverse to the sub-scanning direction as a sheet transport direction, thereby executing image formation and outputting the image.

The main scanning motor 24 is a motor to provide power for moving the carriage 21 in the main scanning direction. The sub-scanning motor 26 is a motor to provide power to the conveyor belt 27 that carries a sheet as an image outputting objective. Each rotation of the main scanning motor 24 and the sub-scanning motor 26 is detected by encoder sensors 25 and 28 and detection signals enter the controller 200, respectively. An electric charging roller 29 charges the conveyor belt 27 and generates an electrostatic force thereon to absorb the sheet of image output objective thereonto.

The controller 100 is a control unit which controls a operation of the image formation apparatus 1, and includes a CPU (Central Processing Unit) 201, a ROM (Read Only Memory) 202, a NV-RAM (Non-Volatile RAM) 204, a RAM (Random Access Memory) 203, an ASIC (Application Specific Integrated Circuit) 205, a host I/F 206, a printing control unit 207, a motor-driving unit 208, an AC bias supply unit 209, and an I/O 210 as shown in FIG. 1.

The CPU 201 is a calculation device and controls an operation of each section of the controller 200. The ROM 202 is a read-only non-volatile storage media and stores firmware and other programs. The RAM 203 is a volatile storage medium capable of reading and writing information at high speed and is used as a work area for the CPU 201 to process the information. The NV-RAM 204 is nonvolatile storage medium that can read and write information and contains control programs and parameters for control use.

The ASIC 205 is a hardware circuit to perform image processing required when an image is formed and outputted. The host I/F 206 is an interface for receiving drawing data from the information processing system 1, and is constituted by Ethernet (Registered Trade Mark) or an USB (Universal Serial Bus) interface. The I/O 210 is a port to input a detection signal sent from various sensors, such as encoder sensors 25 and 28, etc., into the controller 200.

The printing control unit 207 includes a data transfer device for controlling the printing head 23 included in the carriage 21 to operate and a driving waveform generator for generating driving waveforms. The motor-driving unit 208 drives the main and sub-scanning motors 24 and 26. The AC bias supply unit 209 provides an AC bias to the electric charge roller 29.

As described above, the drawing data inputted from the information processing system 1 enters the host I/F 206 in the controller 200, and is stored in a reception buffer provided in the host I/F. The CPU 201 executes calculation in accordance with programs loaded on the RAM 203, and reads and parses the drawing data stored in the reception buffer included in the host I/F 206. The CPU 201 then controls the ASIC 205 and performs required image processing and data reordering or the like. After that, the CPU 201 controls the printing control unit 207 to transfer the drawing data processed in the ASIC 205 to the head driver 22.

The printing control unit 207 transfers the drawing data as described above in a state of serial data to the head driver 22. The printing control unit 207 at the same time outputs a transfer clock, a latch signal, and an ink droplet signal (a signal mask) or the like required in transferring the drawing data and fixing the transferring process or the like to the head driver 22. The printing control unit 207 also includes a D/A converter applying D/A conversion to pattern data of a driving signal stored in the ROM 202, a driving waveform generation unit composed of a voltage amplifier and a current amplifier etc., and a driving waveform selection device for providing a waveform to the head driver 22. The printing control unit 207 thus generates a driving waveform consisting of a single or multiple driving pulses (driving signals) and outputs this or those pulses to the head driver 22.

The head driver 22 drives the printing head 23 by selectively applying a driving signal constituting a driving waveform when given from the printing control unit 207 to a driving element that generates energy to discharge ink droplets from the printing head 23 based on serial inputs of one line of the drawing data. At that time, the head driver 22 separately ejects dots of different sizes, such as a large droplet (a large dot), a medium droplet (a medium dot), and a small droplet (a small dot), etc., by choosing a driving pulse forming a driving waveform, for example.

In addition, the CPU 201 calculates a driving output value (a control value) for the main scanning motor 24 based on velocity detection and position detection values obtained by sampling a detection pulse outputted from a linear encoder sensor 25 and velocity detection and position objective values obtained from velocity and position profiles previously stored. The CPU 201 then drives the main scanning motor 24 via the motor-driving unit 208. Similarly, the CPU 201 calculates a driving output value (a control value) for the sub-scanning motor 26 based on velocity detection and position detection values obtained by sampling a detection pulse outputted from an encoder sensor 28 constituting a rotary encoder and velocity and position objective values obtained from velocity and position profiles previously stored. The CPU 201 then drives the sub-scanning motor 26 via the motor-driving unit 210.

Figure 5:
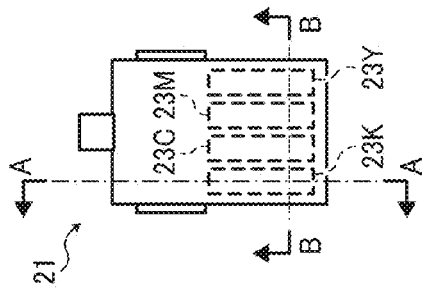
FIG. 5 is a diagram that schematically illustrates a printing head according to one embodiment of the present invention.

Here, a system of the printing head 23 provided in the carriage 21 is described with reference to FIG. 5. As shown in FIG. 5, multiple printing heads 23K, 23C, 23M, and 23Y collectively serving as the printing head 23 for respective colors of CMYK (Cyan, Magenta, Yellow, and blacK) are installed on the carriage 21 according to this embodiment.

Figure 6A:
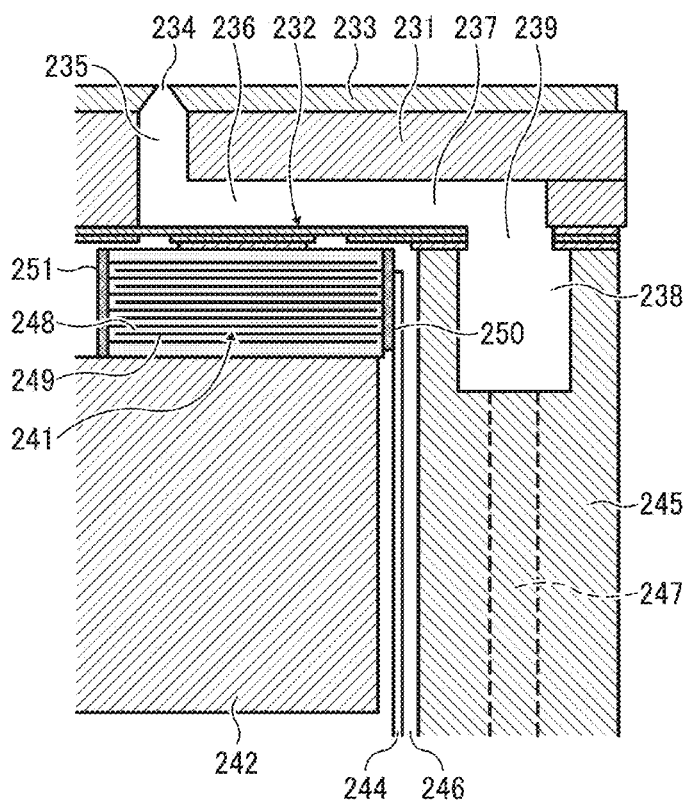
FIGS. 6A and 6B are cross-sectional views of the printing head according to one embodiment of the present invention.
Figure 6B:
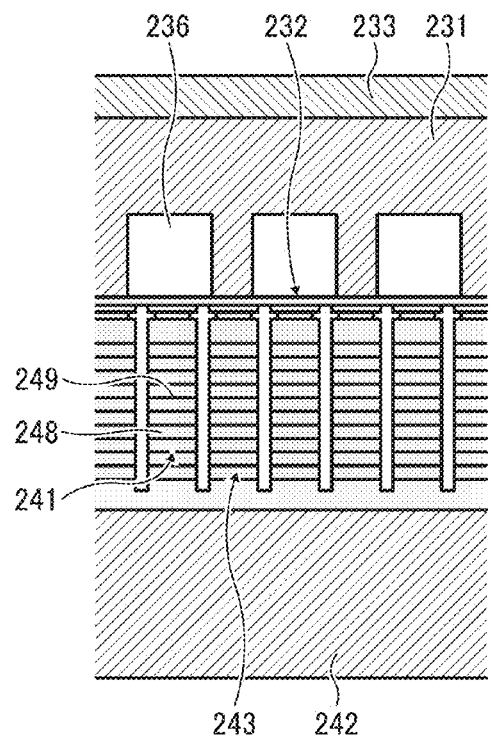

FIG. 6A is a cross-section when viewed along a line A-A in FIG. 5. FIG. 6B is a cross-section when viewed along a line B-B in FIG. 5. As shown in FIGS. 6A and 6B, the printing head 23 bonds and stacks a flow channel plate 231 produced by applying anisotropic etching on a single crystal silicon substrate. A vibration plate 232 produced, for example, by nickel-electric casting is bonded to the underside of the flow channel plate 231. Further, a nozzle plate 233 is bonded to the top of the flow channel plate 231 thereby forming a laminate. With these devices, a nozzle coupling passage 235 as a flow channel, with which a nozzle 234 that ejects ink droplets communicates, a liquid chamber 236 as a pressure generator, and an ink supply opening 239 that communicates with a common liquid chamber 238 to supply ink to the liquid chamber 236 via a fluid resistance unit (supply route) 237 are formed.

Further, two lines of a stack type piezoelectric elements 241 of an electrical mechanical transducer serving as a pressure generator for transforming the vibration plate 232 to pressurize ink in the liquid chamber 236 (i.e., an actuator device), and a base substrate 242 that firmly connects the piezoelectric element 241 thereon are provided. Furthermore, between the piezoelectric elements 241, a prop unit 243 is provided. The prop unit 243 is produced together with the piezoelectric element 241 at the same time by applying splitting processing to the piezoelectric element member. Since any driving voltage is not applied, the piezoelectric element just serves as the prop.

An FPC cable 244 incorporating a driving circuit (a driving IC) not shown is connected to the piezoelectric element 241. Further, a fringe section of the vibration plate 232 is connected to a frame member 245. In the frame member 245, there are provided a penetration unit 246 incorporating an actuator unit consisting of a piezoelectric element 241 and a based substrate 242 or the like, a recess section serving as a common liquid chamber 238, and an ink supply hole 247 to supply ink from an outside to the common liquid chamber 238.

The nozzle plate 233 forms a nozzle 234 having a diameter of from 10 μm to 30 μm corresponding to each liquid chamber 236, and is bonded with adhesive to the flow channel plate 231. The nozzle plate 233 is formed from a nozzle forming member consisting of metal material and a water repellent layer overlying thereof as a topmost surface through a prescribed layer.

The piezoelectric element 241 is a multilayer piezoelectric actuator formed by alternately laminating piezoelectric materials 248 and internal electrodes 249. A PZT ($PbZrO_3$—$PbTiO_3$) element is utilized as the piezoelectric element 241 here. An individual electrode 250 and a common electrode 251 are connected to each internal electrode 249 alternatingly drawn out to different ends of the piezoelectric element 241. Furthermore, ink stored in the liquid chamber 236 is pressurized by upward disarrangement in a piezoelectric direction of the piezoelectric element 241 in the embodiment as shown in the drawing. Further, a single column of piezoelectric elements 241 can be provided on a single substrate 242.

In this liquid discharge detection head, a voltage is decreased from a reference potential and is applied to the piezoelectric element 241, so that the piezoelectric element 241 shrinks. The vibration plate 232 descends and a volume of the liquid chamber 236 increases, so that the ink flows in the liquid chamber 236. After that, a voltage is increased and applied to the piezoelectric element 241 and the piezoelectric element 241 is elongated in the laminated direction, so that the vibration plate 232 is deformed in the direction of the nozzle 234 and the volume of the liquid chamber 236 increases. Consequently, printing liquid stored in the liquid chamber 236 is pressurized, and the printing liquid are discharged (injected) from the nozzle 234 as a droplet.

Further, the voltage applied to the piezoelectric element 241 is returned to a reference voltage and the vibration plate 232 is returned to an initial position, so that the liquid chamber 236 is expanded and the negative pressure occurs. At that moment, the printing liquid is filled in n the liquid chamber 236 from the common liquid chamber 238. Then, after vibration of a meniscus plane of the nozzle 234 attenuates and is stabilized, an operation process advances to a liquid droplet discharging step.

Figure 7:
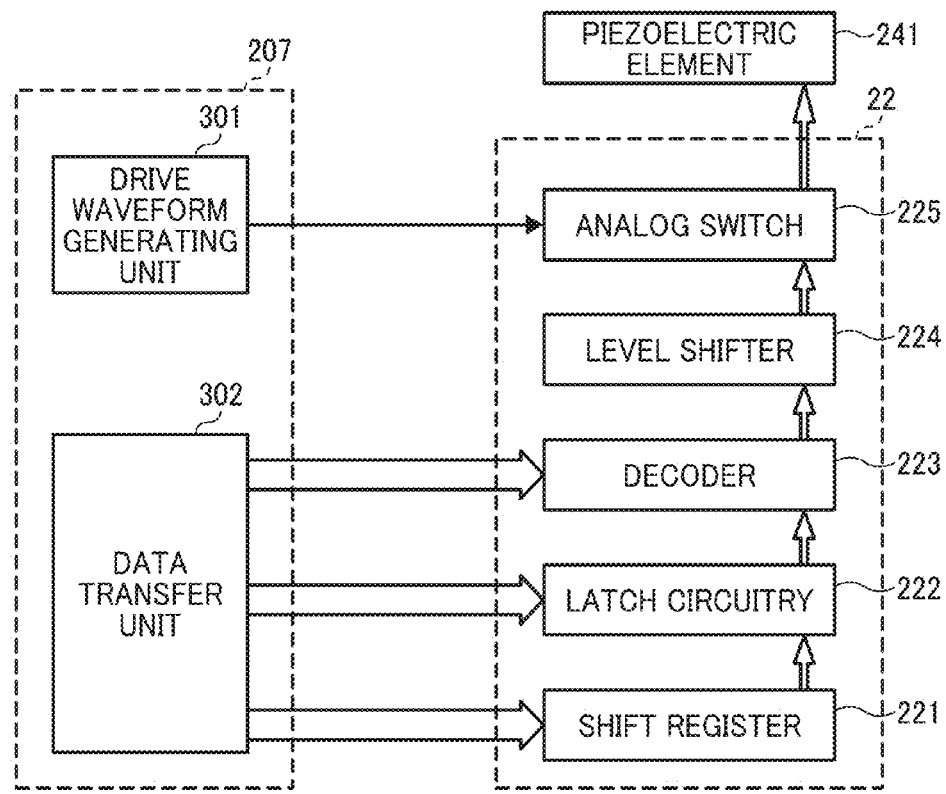
FIG. 7 is a diagram illustrating a functional system of a head driver according to one embodiment of the present invention.

Now, with reference to FIG. 7, a printing control unit 207 and a head driver 22 are described. The printing control unit 207 includes a driving waveform generation unit 301 that generates and outputs a driving waveform (i.e., a common driving waveform) consisting of multiple driving pulses (i.e., driving signals) per print cycle as described above, and a data transfer unit 302 that outputs print data of 2-bit in accordance with a printed image (gradation signals, 0, 1), a clock signal, a latch signal (LAT), and droplet control signals M0 to M3.

The droplet control signal is a 2-bit signal instructing an analog switch 225 as a switching device of the later described head driver 22 to open and close. The droplet control signal changes synchronizing with a printing cycle of the common driving waveform to an H-level (ON) with a waveform to choose and changes to an L-level (OFF) when not choosing.

The head driver 22 includes a shift register 221 that receives a transfer clock (a shift clock) and serial print data (i.e., gradation data: 2 bits/CH) from the data transfer unit 302, a latch circuit 222 for latching each resist value of the shift register 221 based on a latch signal, and a decoder 223 that decodes gradation data and droplet control signals M0 to M3 and outputs such decoding result as well. The head driver 22 further includes a level shifter 224 that shifts a logic level voltage signal of the decoder 223 to a prescribed level, and the analog switch 225 operable in the prescribed level and turned on and off (open and close) by an output of the decoder 223 provided via the level shifter 224.

The analog switch 225 is connected to a selective electrode (an individual electrode) 250 of each piezoelectric element 241 and receives a common driving waveform from the driving waveform generation unit 301. Therefore, the analog switch 225 is turned on in accordance with a result of decoding of the printing data (i.e., gradation data) and the droplet control signals M0 to M3 serially transferred by the decoder 223, so that a prescribed driving signal constituting a common driving waveform passes therethrough (i.e., is chosen) and is applied to the piezoelectric element 241.

Figure 8:
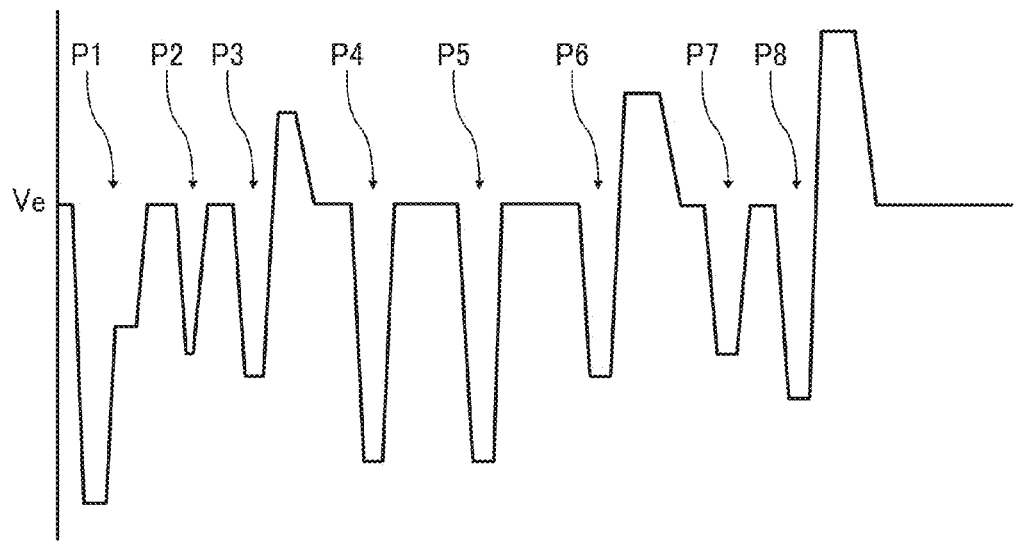
FIG. 8 is a diagram showing a driving signal of (provided to) the head driver according to one embodiment of the present invention.

Now, with reference to FIGS. 8 and 9, one example of a driving current waveform is described. As shown in FIG. 8, the driving waveform generation unit 301 generates and outputs a driving signal (a driving waveform) including eight driving pulses P1 to P8 each consisting of a waveform element dropping from a reference potential Ve and a waveform element rising after a dropping state and the like per print cycle (one driving cycle). One print cycle is determined based on the maximum frequency. Further, a driving pulse to use is chosen from (based on) droplet control signals M0 to M3 sent from the data transfer unit 302.

When a small droplet (a small dot) is formed based on one of droplet control signals M0 to M3 sent from the data transfer unit 302, the driving pulse P1 is chosen as shown in FIG. 9A. Whereas to form a medium titration (a medium size dot), the driving pulses P4 to P6 are chosen as shown in FIG. 9B. Further, to form a large dot, the driving pulses P2 to P8 are chosen as shown in FIG. 9C. To cause micro driving (i.e., vibrates meniscus without discharging droplet), the fine driving pulse P2 is chosen as shown in FIG. 9D. Thus, each of the pulses is applied to the piezoelectric element 241 in the printing head 23.

The image formation device 2 and the information processing system 1 operate inter-connectedly as described above, so that an image is formed. Specifically, a printing instruction sent from the application 101 working in the information processing system 1 is processed by the printer driver 110 to generate a printing dot pattern having multiple values possible for the image forming apparatus 2 to output. It is then rasterized and transferred to the image formation apparatus 2 as drawing data, so that the image forming apparatus 2 forms and outputs an image.

Specifically, in the image information processing system 1, an instruction (e.g. description of a position, a thickness, and a shape or the like of a line to print, or that of a typeface, a size, and a position or the like of a character to print) sent from the application 101 or the operating system to draw an image or print a character is acquired by a print instruction acquisition unit 111. The instructions are temporarily stored in a drawing data memory. Further, these instructions are described in a prescribed print language.

Further, instructions stored in the drawing data memory are interpreted by a rasterizer included in the drawing information generation unit 112. When the result of interpretation indicates an order of printing a line, a printing dot pattern converted in accordance with a thickness and a position of the line is prepared as specified. Whereas when the result indicates an order of printing a character, corresponding contour information of the character is read from font outline data stored in the information processing system 1, and a printing dot pattern converted in accordance with the size and the position thereof is prepared as specified. Whereas when the result indicates image data, it is converted as is to a printing dot pattern.

The drawing information generation unit 112 then applies given image processing to these printing dot patterns and stores them in the raster data memory. At this time, the information processing system 1 rasterizes data to be a printing dot pattern regarding a rectangular grid as a basic printing position. As image processing, color management processing and gamma correction processing to adjust color, halftone processing, such as a dither method, an error diffusion method, etc., a substrate removal process, and ink total amount regulatory process are exemplified. The printing dot pattern stored in the raster memory is transferred to the ink-jet printer 500 via an interface by the drawing information transfer unit 113.

Half-toning performed in the drawing information generation unit 112 as described above is called halftone processing. The halftone processing executes conversion of gradation of color of image information to a prescribed level in accordance with a gradation of color that the image forming apparatus 2 can express when forming and outputting an image.

As described above, each pixel is formed by ejecting ink from the nozzle 234 included in the printing head 23, and accordingly an image is formed and outputted in the inkjet image forming apparatus 2. At this moment, by switching a size of droplet between the small, the medium, and the large, density can be expressed by about four gradations (2-bit) including colorless per pixel as described above. However, image data is processed with 256 gradations (8-bit) or the like in the PC, such as an information processing system 1, etc., in general.

Therefore, in halftone processing, image data represented by 8-bit, for example, is converted into 2-bit without degrading quality of an image when visually recognized by human eyes. Image data before and after conversion is different when compared with each other per pixel. Because, the number of density gradation decreases after the conversion. Therefore, in halftone processing, an image is converted using a pulse-surface-area modulation method, so that the image can be similarly recognized by human eyes when compared per given area unit of more than two pixels. As a result, quantization error occurs during the halftone processing due to the pulse-surface-area modulation method.

An error diffusion method and a DBS (Direct Binary Search) method or the like are known as the halftone processing considering quantization error. The error diffusion method weights and accumulates quantization error occurred in each pixel and spreads it to surrounding pixels. In the error diffusion method, fewer Moiré and texture or the like occur when compared with a dither method or the like that executes quantization by repeating prescribed pattern comparisons. However, a dot chain readily occurs inherently on a worm due to the processing method. The DBS method temporary determines arrangement of dots, and computes a quantization error (difference) from an input. The DBS then repeatedly updates the dot arrangement by changing an ON/OFF condition and a type of the dot per pixel or sector when the error reduces. The DBS excels in sharpness of an image while reducing production of worm-like regular pattern generally caused in the error diffusion method.

The above-described data processing is a theoretical. Specifically, each pixel in digital data is basically treated as having a rectangular shape. However, each dot fixed and formed on a sheet by ink ejected from the nozzle 234 has a circular shape. Therefore, a state of occupation on a sheet is different in accordance with presence or absence and a type of the dot in an adjacent pixel position.

Further, as described in FIGS. 6A and 6B, the ink is discharged from the nozzle 234 under a mechanical control. Therefore, performance of a droplet landing image varies per nozzle 234 due to various factors, such as a difference in fine shape of the nozzle 234, a difference in response property of a piezoelectric element 241, etc. Thus, a size of the dot of the droplet landing image may vary, misalignment of the droplet landing image can occur, and a satellite (i.e., distribution of adhesion ink), accidentally occurs, even when the head is driven by the same driving signal. As a result, the above-described problems affect the adjacent pixel.

As a result, an adhesion amount of ink and an overlapping state of dots vary depending on individual performance of the nozzle and the head, unexpectedly. These are visually recognized as a defective image having a tone difference, a line, and a banding or the like by human eyes.

To accommodate such challenges in one embodiment of the present invention, a drawing information generation unit is employed to form a droplet landing model of dots and calculate error instead of a digital value and generates print data considering (based on) the engine performance when the dot replacement process is executed based on the error calculation using the DBS method.

Thus, when an image is formed and is outputted by the image formation apparatus 2, an image patch is generated by a dot pattern generation 114 and is printed in advance. A read image acquisition unit 115 then obtains data of the thus generated patch image by reading it with a sensor or a scanner, etc. A nozzle characteristic judgment unit 116 then generates a droplet landing model of a dot to be formed by the nozzle 234 of the image formation apparatus 2 based on the patch image data. The drawing information generation unit 112 then simulates a dot to be ejected by each nozzle 234 based on the droplet landing model in a subsequent drawing data generation process for forming an image to be outputted.

Figure 10A:
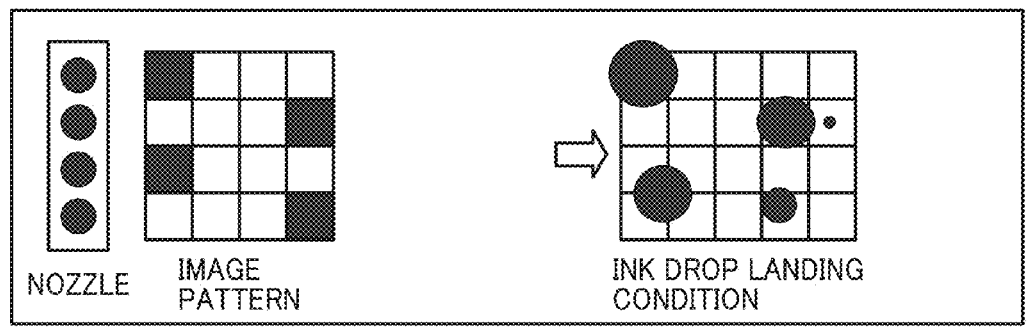
FIGS. 10A to 10C are diagrams each demonstrates a droplet landing state and a dot pattern according to one embodiment of the present invention.
Figure 10B:
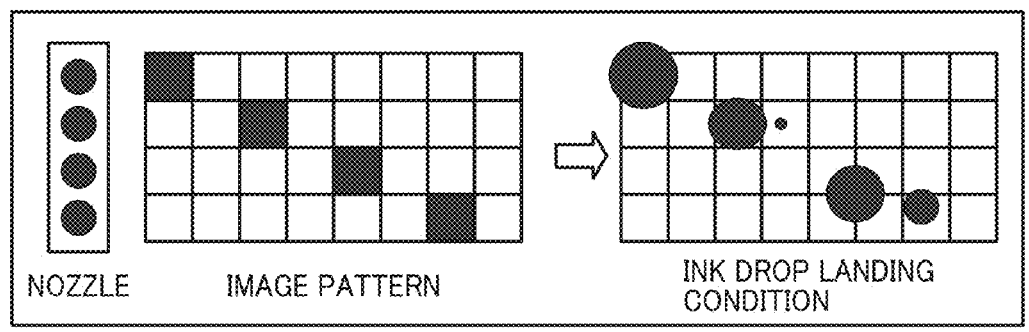

Now, one example of an image pattern generated by the dot pattern generation unit 114 is initially described according to the one embodiment of the present invention. The dot pattern generation unit 114 generates the image pattern as shown in FIGS. 10A and 10B and inputs it into the printing instruction acquisition unit 111. Specifically, the dot pattern generation unit 114 causes the image formation apparatus 2 to form and output an image of the image pattern. The read image acquisition unit 115 obtains image data generated by reading the image (pattern) outputted onto a sheet with the scanner, etc., and the nozzle characteristic determining unit 116 acquires a dot model to be formed by the nozzle 234.

Figure 11:
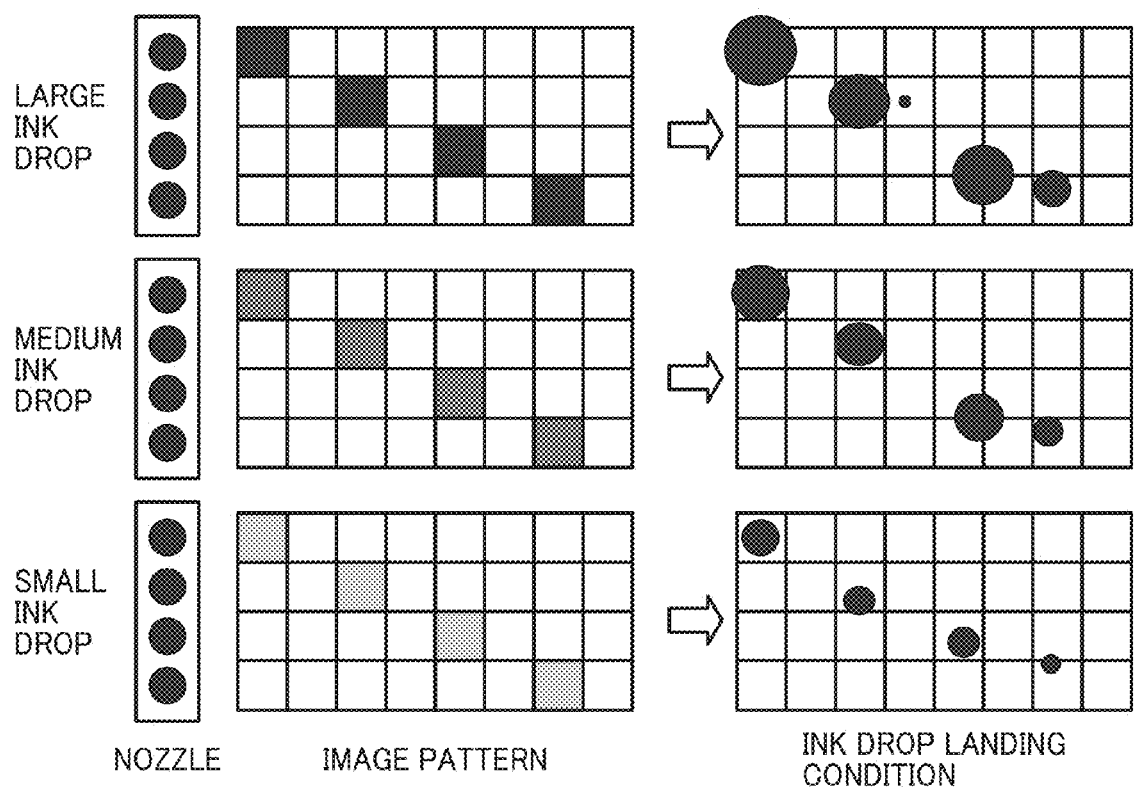
FIG. 11 is a diagram showing another example of the droplet landing state and the dot pattern according to one embodiment of the present invention.

Further, the nozzle performance determining unit 116 compares a dot pattern generated by the dot pattern generation unit 114 with dot pattern image information generated by reading the dot pattern acquired by the read image information acquisition unit 115 as shown in FIGS. 10A, 10B, and 11. Hence, the nozzle performance determining unit 116 generates nozzle characteristic information including a location, a size, a shape, and a satellite (i.e., distribution of adhesion ink) of ink ejected by each of the multiple nozzles 234 of the image forming apparatus 2 and adhered onto a sheet medium as an image forming output objective.

Figure 10C:
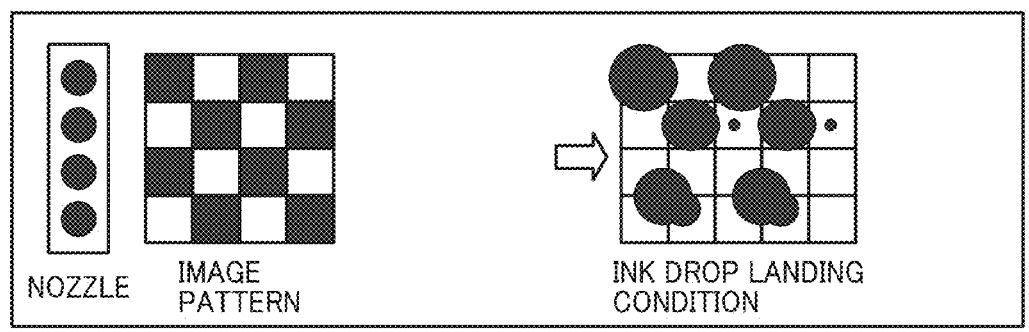

FIGS. 10B and 10C illustrates a carriage 21 having four lines of nozzles 234 on a column to form a pattern of four lines as the most basic example provided for CMYK colors, respectively. An image pattern thereby formed is designated based on arrangement of the nozzles 234 in the head line type printing head or the like.

A layout of the image pattern generated by the dot pattern generation unit 114 is not particularly limited to the above-described example. However, when dot formation density of the pattern is high, a dot combines with a surrounding dot as shown in FIG. 10C, so that distinction of these dots becomes difficult. Specifically, it is unknown that which one is ejected from an applicable nozzle. Thus, as shown in FIGS. 10A and 10B, it is desirable that the pattern has a sufficient clearance so that dots can be distinguished so that it is known that which one is ejected from an applicable nozzle even though a size or a droplet landing position of a dot changes.

Further, in a printer which can handle dots of multiple sizes, a reference size of the dot varies in accordance with a type of an ink droplet. Further, droplet landing performance sometimes varies in accordance with a type of a droplet such that the large one lands on a position as intended, whereas the medium one easily curves and the like. Because of this, it is desirable that a droplet landing model is previously obtained by printing an image pattern per droplet type and reading it as shown in FIG. 11.

Now, halftone processing executed by the drawing information generation unit 112 utilizes the DBS method is described according to the one embodiment of the present invention. Specifically, an error from an inputted image is sought while changing density, e.g. an on/off condition and a type of a dot in a target region within a gradation range possible for the image formation apparatus 2 to handle. When the error is smaller than before, arrangement of dots is updated to be a changed state to reduce the quantization error.

Here, it is acceptable either a target pixel is changed and an error determination process determining an error is executed per pixel or these processes are done per prescribed sector of pixels. In the latter situation, replacement of the type and the on/off condition of the dots are executed per prescribed sector of pixels and arrangement thereof is chosen per prescribed sector to reduce the error. Further, because a dot gain exists in actual data, an adjacent pixel sometimes does not affect an error (of a target pixel) depending on a processing order. Because of this, a process to execute recalculation of error and reviewing of arrangement can be employed after one processing cycle of data. At that moment, a manner of partitioning a region for reviewing the arrangement can be changed.

As a criterion of terminating the processing, a number of processing times and a time point when an error is no longer reduced from a previous process are exemplified. Further, the half-toning can be executed using a dithering or error diffusion process and the like and an arrangement of dots can be processed as a starter. Beside, instead of determining the replacement every after error comparison based on the minimum error, the replacement can be determined using a simulated annealing method.

Further, a feature of one embodiment of the present invention is to evaluate an error supposing that an acquired dot model, not just digital data, is printed. Therefore, the drawing information generation unit 112 replaces dot arrangement, which is obtained by converting image data as an output objective in accordance with gradation ability of the image formation apparatus 2, with the dot model of each nozzle 23 formed based on performance of the nozzle acquired by the nozzle performance determining unit 116. The drawing information generation unit 112 then simulates an image after droplet landing.

Figure 12:
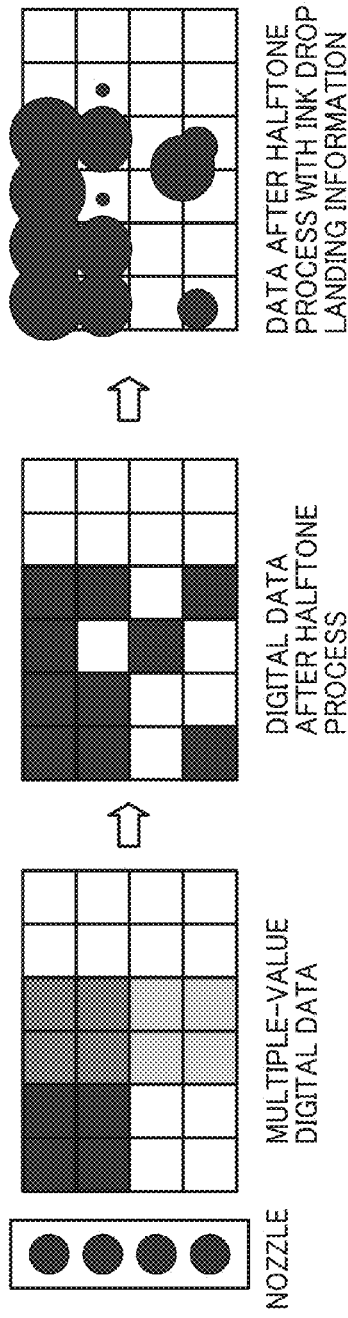
FIG. 12 is a diagram showing an aspect of a droplet landing simulation according to one embodiment of the present invention.

Specifically, for example, the drawing information generation unit 112 first applies halftone processing to input data (i.e., original image data serving as an output objective) inputted to each nozzle as shown in the left side drawing of FIG. 12, and executes quantization as shown in a central diagram thereof. Further, as shown in a right side diagram of FIG. 12, the drawing information generation unit 112 generates data supposing a droplet landing condition of ink ejected from each nozzle 23, namely ink distribution data, based on nozzle performance acquired by the nozzle characteristic determining unit 116.

Subsequently, the drawing information generation unit 112 calculates an error between an image after the droplet landing and the input data. At this moment, the drawing information generation unit 112 calculates the error by comparing a level of the inputted image with ink adhesion in a region corresponding to a pixel of the input data. For example, the error is converted into a multiple-value level based on an ink covering amount at a location corresponding to the pixel of the input data. For example, when the input data has a density gradation from 0 to 255, wherein 255 represents black, and the area covering amount at an applicable pixel is 50%, an output at its position is half the values (0~) 255, i.e., 127. Then, a difference from the input data serves as the error.

Figure 13:
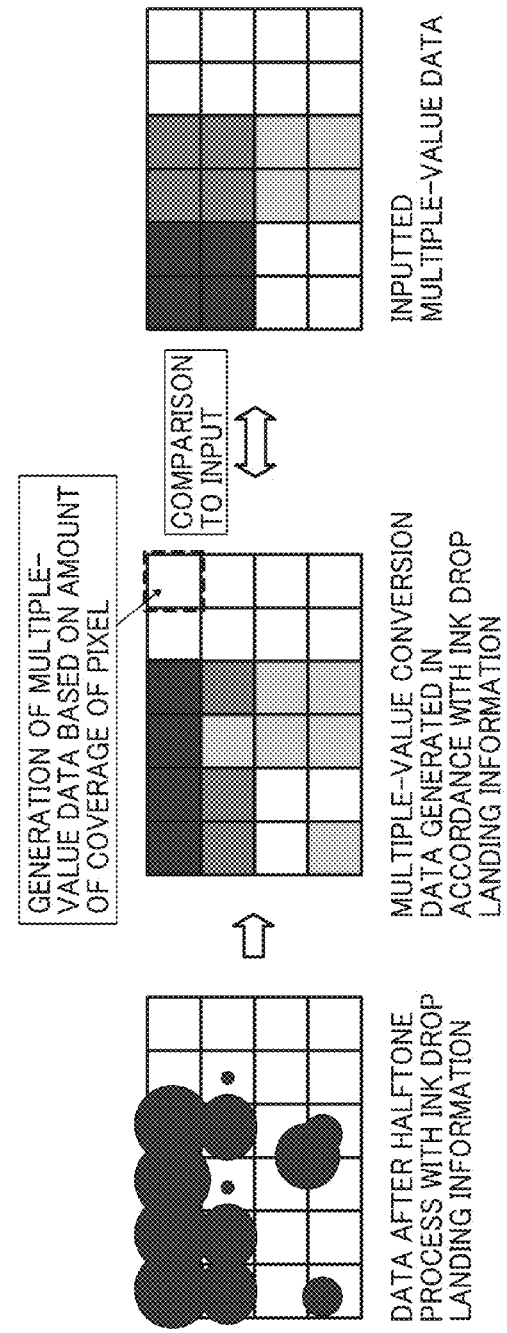
FIG. 13 is a diagram showing an aspect of quantization error comparison according to one embodiment of the present invention.

The left side diagram of FIG. 13 illustrates simulated data corresponding to the right side diagram of FIG. 12. The right side diagram of FIG. 13 is input data corresponding to the left side diagram of FIG. 12. The drawing information generation unit 112 converts data of left side diagram of FIG. 13 into multiple value data so that an ink covering amount from 0% to 100% corresponds to density gradations of from 0 to 255, and generates multiple value simulation data as shown in a central diagram of FIG. 13. Hence, the multiple value simulation data thus generated is compared with the input data shown in the right side diagram of FIG. 13, and a difference therebetween is regarded as the error.

Instead of the covering amount, the processing of FIG. 13 can be based on brightness or density. For example, conversion is executed such that the minimum density (i.e., sheet background density) corresponds to 0, while the maximum density corresponds to 255. In this way, the drawing information generation unit 112 according to this embodiment repeats error calculation and comparison while changing a quantization condition considering performance of a nozzle. Thus, the drawing information generation unit 112 determines a quantization condition that reduces an error from an input data or image considering the performance of the engine.

Figure 14:
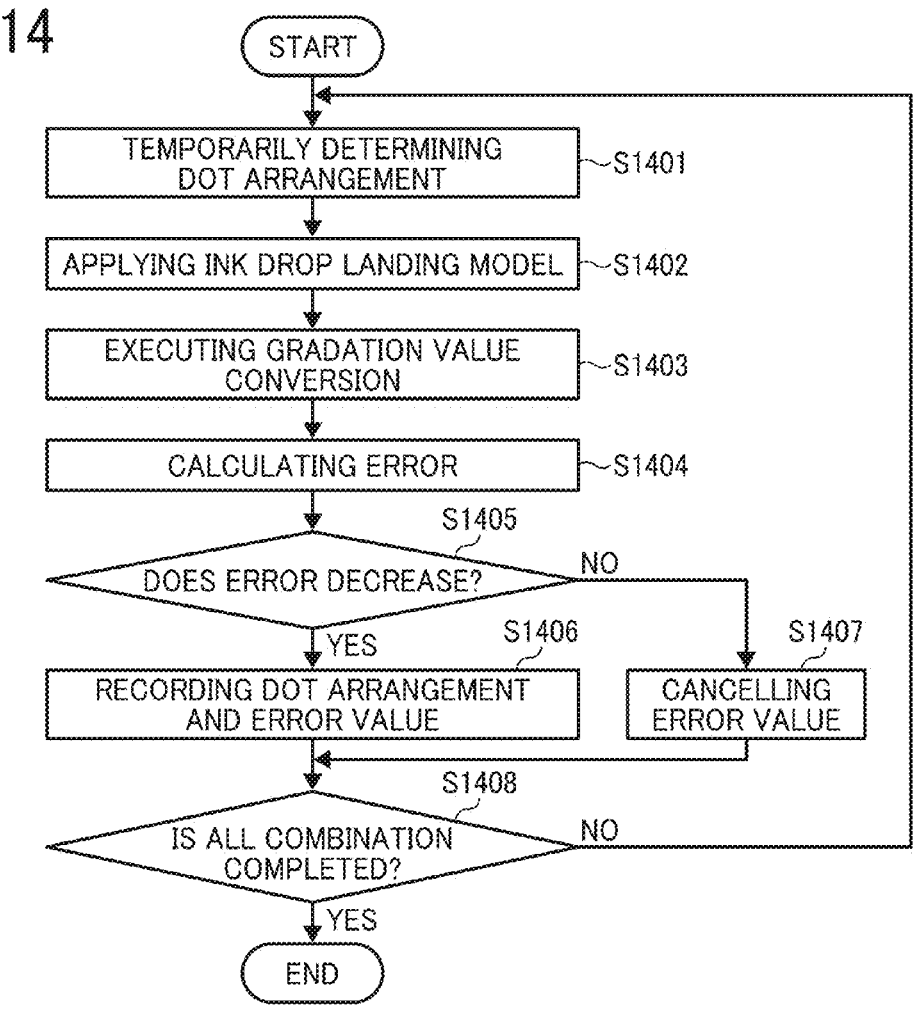
FIG. 14 is a flowchart showing an operation of a drawing information generation unit according to one embodiment of the invention.

FIG. 14 is a flowchart illustrating one example of operation of the drawing information generation unit 112 according to one embodiment of the present invention. An example this embodiment is explained supposing that the total number of pixels of an image as an output objective is "M", while the number of density gradations of input data is "A". First of all, the drawing information generation unit 112 provisionally determines dot arrangement as shown in FIG. 14 for all of the M pixels (S1401).

In other words, during processing in step S1401, a gradation of an image as an image formation and output objective is converted to that of a pixel capable of being expressed by a printing head 23 of the image forming apparatus 2 in such a manner that the multiple-level digital data of the left side drawing of FIG. 12 is converted into halftone processed digital data of the central drawing thereof. Specifically, the process of S1401 generates a gradation converted image. Accordingly, the drawing information generation unit 112 acts as a gradation conversion unit.

Subsequently, the drawing information generation unit 112 applies a droplet landing model to the provisional dot arrangement obtained in S1401 as shown in the right side drawing of FIG. 12 thereby generating data of droplet landing simulation (S1402). In other words, the processing of S1402 generates simulation information of a result of forming and outputting an image, based on a gradation converted image and information describing performance of a nozzle 234 in the printing head 23 of the image forming apparatus 2. Specifically, the drawing information generation unit 112 serves as an output result simulation unit.

Further, the drawing information generation unit 112 converts a gradation value of the droplet landing simulation information into multiple-value conversion data as shown in the central drawing of FIG. 13 (S1403). Thus, the processing in step S1403 is a process of converting the simulation information of image formation and output result to the gradation of a pixel constituting the original image as the image formation and output objective.

When the multiple-value conversion data is generated, the drawing information generation unit 112 compares the pixel of the original input data with that of the multiple-value converted data, and calculates quantization error as explained in the central and right side drawings of FIG. 13 (S1404). Thus, the drawing information generation unit 112 acts as a simulation error calculation unit in steps S1403 and S1404. The drawing information generation unit 112 then compares quantization error already calculated and stored with the thus newly calculated quantization error (S1405). When the newly calculated error value decreases (smaller) (S1405/YES), the drawing information generation unit 112 records (information of) current dot arrangement and the newly calculated error value in a storage medium (S1406).

Whereas, when the newly calculated error value does not decrease (larger) (S1405/NO), the drawing information generation unit 112 disposes such error value (S1407). The drawing information generation unit 112 repeats this processing (S1408/NO) from steps S1401 to S1407 until the end of all combinations of dot arrangements. The drawing information generation unit 112 terminates processing when all combinations are processed (S1408/YES).

In other words, the processing in step S1408 is a process to designate one of images with their gradations differently converted as drawing information based on the error value calculated in step S1404 when an image is formed after gradation is converted in step S1401. Thus, the drawing information generation unit 112 acts as a drawing information determination unit. With this like process, a dot arrangement with the fewest error value is recorded. When a process relates to the first set of dot arrangement and thus no error value has been stored yet, the drawing information generation unit 112 omits the step S1405 and records a calculated error value.

Figure 15:
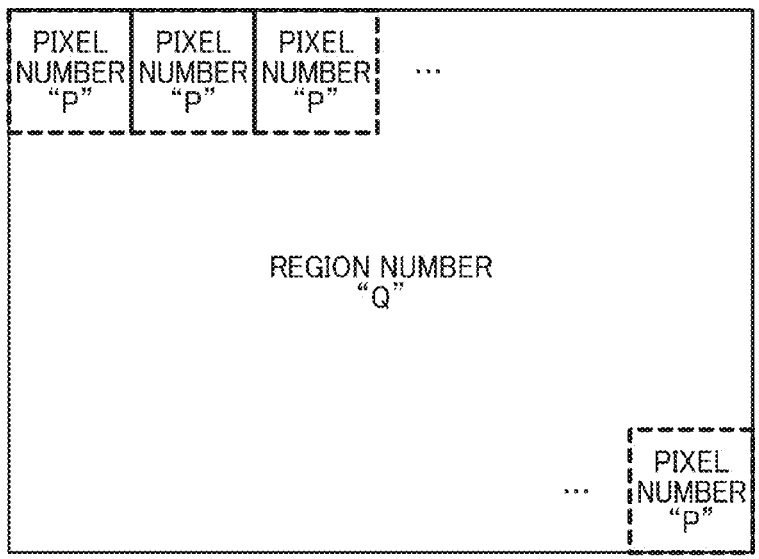
FIG. 15 is a diagram showing an example of a quantization procedure executed per divisional region according to one embodiment of the present invention.

Further, instead of simulating by replacing all pixels per combination as shown in FIG. 14, a target image is divided into multiple regions and the processing of FIG. 14 can be applied per region to replace pixels and specify a combination with smallest error per region. In such a situation, because the arrangement is determined per region, the number of combinations of dots decreases to be less than that as shown in FIG. 14, an amount of computation can be minimized. For example, as shown in FIG. 15, when the number of pixels per region is "P", the number of multiple values "A" (including no dot), and the number of regions is "Q", the combination is obtained as "$A^P \times Q$".

Furthermore, the arrangement of each region can be executed in parallel or sequentially given a prescribed priority. If the priority is given and an arrangement condition in a prescribed region is initially determined, that of the next region is sought by applying a droplet landing model previously used in processing as shown in FIG. 16.

Figures 16A, 16B, 16C, 16D, 16E, 16F:
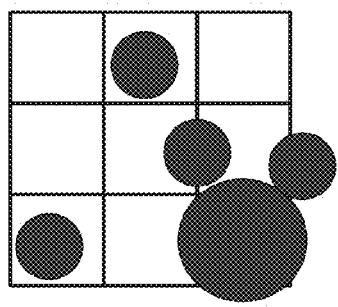
FIGS. 16A to 16F are diagrams showing another quantization procedure executed per divisional region according to one embodiment of the present invention.

FIG. 16A illustrates a situation where one region is separated into a 3×3 square. When a droplet landing model is applied, due to affection of a dot gain, curvature, and a satellite (i.e., distribution of adhesion ink), actual ink adhesion sometimes deviates from this region. When processing is executed in parallel, since a dot arrangement is not fixed yet between each of adjacent regions, there is no information at a boundary, and an accurate simulation is not available.

Whereas, when it is processed in the given priority order, a dot arrangement in a region previously processed is fixed. Accordingly, a dot arrangement in an adjacent region can be chosen by applying droplet landing information used in the previously processed region.

Further, every priority order can be employed for the sequential processing. For example, an order of a raster as shown in FIG. 16B, a left upper start order as shown in FIG. 16C, and a central start order as shown in FIG. 16D can be exemplified. Otherwise, as shown in FIGS. 16E and 16F, another processing manner given a priority order of a Bayer state pattern can be employed.

Further, a system of FIGS. 16C to 16F can handle greater numbers of regions at the same time than that of FIG. 16B, and accordingly, able to easily perform parallel processing with a computing technology, such as a multiple-core, etc. For this reason, it is advantageous in terms of a processing velocity. Thus, when processing is executed by giving a prescribed priority to the regions in this way and an arrangement in the subsequent region is sought while applying the droplet landing model generated in the already processed region, more precise simulation is obtained. Accordingly, drawing data can be generated to be able to form and output a highly accurate image considering performance of a nozzle.

Furthermore, in each of situations of FIGS. 14 and 15, when a quantization condition is changed, i.e., color or colorless conditions of a pixel are switched therebetween, a gradation value of density of the image forming apparatus 2 is changed, a droplet landing simulation is also updated by applying a droplet landing model in step S1402 of FIG. 14 as the pixel changes.

Figure 17A:
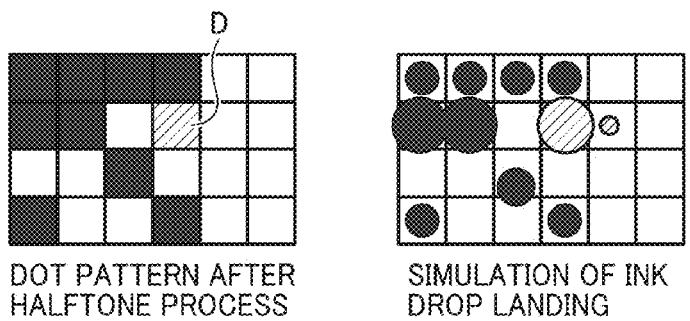
FIGS. 17A and 17B are diagrams showing an example of a droplet landing state and a dot pattern according to one embodiment of the present invention.

In this situation, when it is supposed that an droplet landing simulation of a dot pattern shown in the left diagram of FIG. 17A becomes a state as shown in the right diagram thereof, the simulation of droplet landing corresponding to a pixel D impacts not only on a covering amount of the pixel D but also that of a surrounding pixel due to a size of a dot and a satellite (i.e., distribution of adhesion ink), as shown there.

Figure 17B:
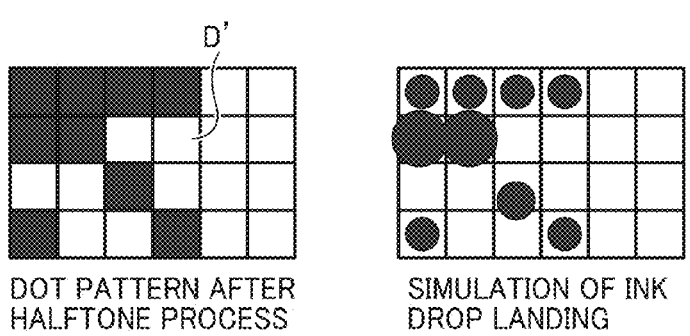

Whereas, when the quantization condition is changed in such a manner that a dot pattern of the left side diagram of FIG. 17A is changed to that of the left side diagram of FIG. 17B, the pixel D disappears. Thus, because not only the covering amount of the pixel D but also that of a surrounding pixel changes, a gradation value of the surrounding pixel needs to be converted again as in step S1403.

As described heretofore, according to one embodiment of the present invention, since the information processing system 1, in which a printer driver 110 is installed to cause the image forming device 2 to form and output an image, calculates an error value between a dot pattern quantized by a DBS method and original image data, and chooses an optimum dot pattern, an image can be formed and outputted in accordance with performance of an engine of the image forming device 2. Further because, the information processing system 1 compares and calculates an error value between droplet landing simulation executed based on droplet landing performance of a nozzle of a printing head 21 and original image data.

Further, a droplet landing model of dots changes in accordance with an operating condition of a printing environment of a device, such as a type of printing sheet, a printing mode, temperature, humidity, etc. A manner of wetting and spreading of a dot on a sheet varies depending on a sheet type even ejecting the same dot thereon. Further, when a mode or environment changes, ink viscosity determined based on a driving condition of a printing head, a sheet conveyor velocity, humidity, and temperature also changes. Accordingly, discharge performance of the printing head itself changes.

Because of this, it is favorable that acquisition and application of the droplet landing model can be designated and executed per sheet type, print mode, and printing environment. Hence, an image can be formed under an optimum printing condition.

As a time of acquiring the droplet landing model, various factors can be exemplified as a trigger, such as a startup time of a device, a head replacement time, when a given time has elapsed during an operation of the device, when a given print number has counted up, when an operation environment, such as humidity, temperature, etc., changes more than a prescribed level, when a sheet type or a mode is changed, and a time specified by a user. This is because, the configuration, the usage environment, and the elapsing time can be conditions capable of readily changing the droplet landing performance.

Further, the head possibly changes the droplet landing performance when it is replaced. In such a situation, the head is typically replaced per color of C, M, Y, and K, etc. Thus, when only a droplet landing model of a replaced head is obtained and used, the number of processing steps can be omitted.

These processing of from printing of an image pattern to acquisition of the droplet landing model and reviewing based thereon can be conducted entirely or partially. For example, it is conducted from acquisition of patch image data by an image information acquisition unit 115 until generation of an droplet landing model by the nozzle performance judgment unit 116, and the droplet landing model is updated to reduce the number of processing steps when a difference between a newly generated droplet landing model from that previously generated and currently applied exceeds a prescribed threshold.

These processes can be achieved by printing a gradation and a color patch together with an image pattern and picking up these performances beforehand, and reevaluating the droplet landing model when any performance changes by more than a prescribed amount. More specifically, information, such as brightness, density, and RGB values or the like obtained by a sensor or a scanner is utilized, and the droplet landing model is updated when any one of these performances changes by a prescribed amount.

As an alternative method, a variation in covering amount of ink from a nozzle is compared, and a droplet landing model is reevaluated when comparison results deviates from a specified amount. A criterion of reviewing can be an absolute value. Further, an image pattern is printed multiple times and a repetitious variation is picked up during continuous printing. A droplet landing model is then updated when the variation exceeds a prescribed level based on an estimation that the performance has changed.

It is explained in the above-described embodiment that the printer driver 110 of the information processing system 1 includes the read image acquisition unit 110 and the nozzle performance determining unit 116 as shown in FIG. 3. However, such a system may be included in the image formation apparatus 2 so that the information processing system 1 downloads a droplet landing model therefrom. Hence, with the system in which the image formation device 2 can generate a droplet landing model by itself, it can conduct from formation of an image to outputting the image by itself considering the performance of the engine.

As a specific embodiment of the information processing system 1 and the image forming apparatus 2, a commercial printing presses and a control unit are exemplified. In a system used in such a printing field, a halftone image is generated using software or a special device called a RIP (Raster Image Processor), and is frequently inputted to the image forming apparatus to print an image. Further, in such a situation, an advanced capability and a calculation system are frequently employed for image processing.

Therefore, all or any one of generation of image data, acquisition of a droplet landing model, and outputting of a chart can be achieved on the side of the RIP, i.e., an information processing system 1. In such a situation, data including the engine performance can be processed in the RIP, and is flown to the side of the system as a result. Accordingly, even if a particular function is not provided in the image forming apparatus, but at least RIP, the engine performance can be corrected.

Figure 18A:
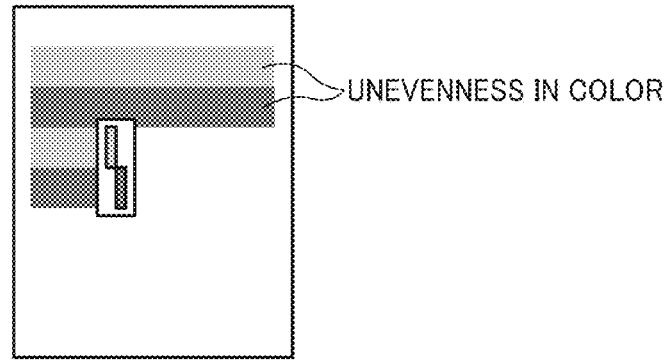
FIGS. 18A and 18B are diagrams showing situations when line and serial type printing heads are employed, respectively, according to one embodiment of the present invention.

The image processing described heretofore is effective regardless of a system, such as serial and line system, etc. However, the above-described image processing can especially demonstrate effectiveness in a serial or line type image forming apparatus having a connected head. Such a serial type apparatus with the connected head is obtained by connecting multiple heads in a head lengthwise direction as shown in a schematic diagram of FIG. 18A, and is designed to widen an image formation region per scanning and increase productivity. Such a serial type apparatus of FIG. 18A is frequently adopted in a system that needs a wide image region to print, such as a large poster printing, etc.

Figure 18B:
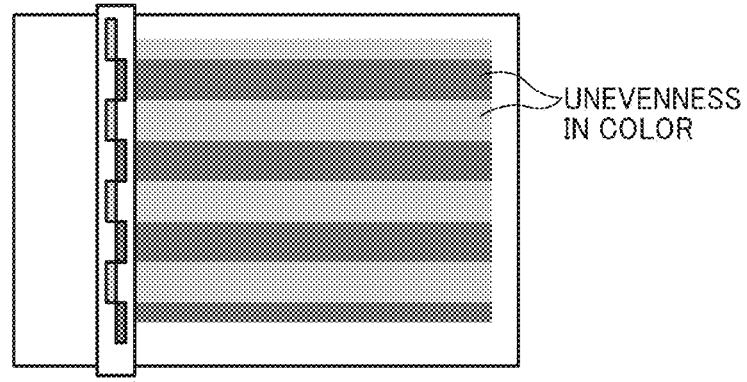

Whereas, in the line-type image formation apparatus, a head is placed over a width of a sheet as shown in a schematic diagram of FIG. 18B, so that an image is formed by conveying a sheet in an orthogonal direction to the head longitudinal direction. The line-type image forming apparatus receives attention in a commercial printing field or the like due to its great productivity.

In such a system, the number of nozzles extraordinarily increases and a droplet landing condition directly affects image quality, because the line type forms an image on a single path. Further, it is technically difficult and is costly to make a single long line head. Thus, it is practical that a head array is formed by placing multiple short heads side by side. As a result, variations in manufacturing a head and a nozzle themselves, and variations caused by a difference in driving circuit system or ink supply system connected to each head and nozzle may sometimes affect the quality.

Further, since multiple heads are integrated, a relative droplet landing position of a dot deviates from an objective or a similar problem occurs when installation of the heads is inaccurate. Thus, irregularity may sometimes occur in a droplet landing performance due to another factor than the discharge performance, and consequently, a belt or a line state color irregularity occurs as shown in FIGS. 18A and 18B.

Even in such a system, by half-toning based on a droplet landing model, a defective image including positional deviation caused not only by a variation on an ink discharge side, such as an electrical system of a printing head 23, a head driver 22, an ink supply system, etc., may be corrected.

Further, in an image forming apparatus employing a line type or a serial type with a combined head, and edge nozzles in adjacent heads are placed being overlapped, an overlapping process is performed such that these overlapping nozzles separately eject droplets to form an image at an overlapping position. Whereas, when the serial system executes adjacent scanning, a newline operation is performed such that the edge nozzles overlap with each other, and an overlapped operation is performed by separately ejecting droplets to form an image at an overlapping position.

In such an overlapping process, when a head assembly position deviates, eccentricity of droplet landing occurs at a head connecting portion, and accordingly, an image stripe sometimes appears. For this reason, some nozzles positioned at the head connecting portion are overlapped to separately eject dots there to minimize the eccentricity of droplet landing and reduces the line.

In such an image forming apparatus employing the overlapping processing, multiple overlapping nozzles are used to form an image at the overlapping portion. Accordingly, to apply this embodiment to an image forming apparatus employing the overlapping operation, separate ejection of droplets needs to be linked to a droplet landing model when forming the overlapping portion.

Figure 19:
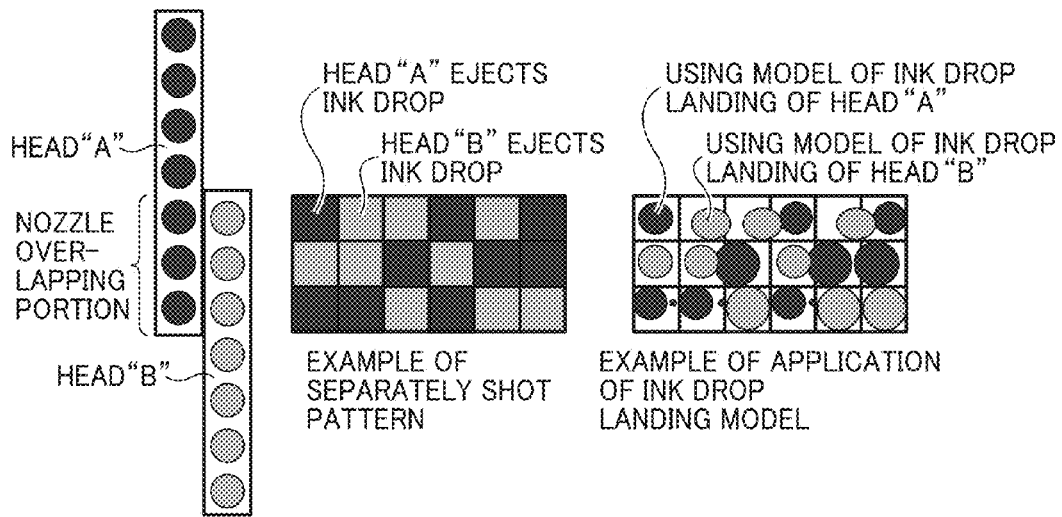
FIG. 19 is a diagram showing a situation when a printing head executes an overlapping process according to one embodiment of the present invention.

FIG. 19 illustrates an example having heads A and B overlapped with each other at their edges to separately form dots on an overlapping region using a mask pattern. In such a situation, the drawing information generation unit 112 applies a droplet landing model for nozzles responsible for image formation after being separated as described with reference to FIG. 10.

To enable to execute processing of FIG. 19, the drawing information generation unit 112 and the nozzle performance determining unit 116 hold information indicating separate ejection at a nozzle overlapping section, such as a dot separate ejection pattern of FIG. 19, etc., (hereinafter referred to as dot separate ejection information). Further, the nozzle performance determining unit 116 generates droplet landing models for heads A and B, respectively, based on dot separate ejection information and patch image data acquired by the read image acquisition unit 115.

Further, the drawing information generation unit 112 generates droplet landing simulation information based on the above-described separate ejection information by applying a droplet landing model in step S1402 of FIG. 14. With the processing, the same effect as described above can be obtained in the image forming apparatus by executing the overlapping operation with a droplet landing model according to this embodiment.

Figure 20:
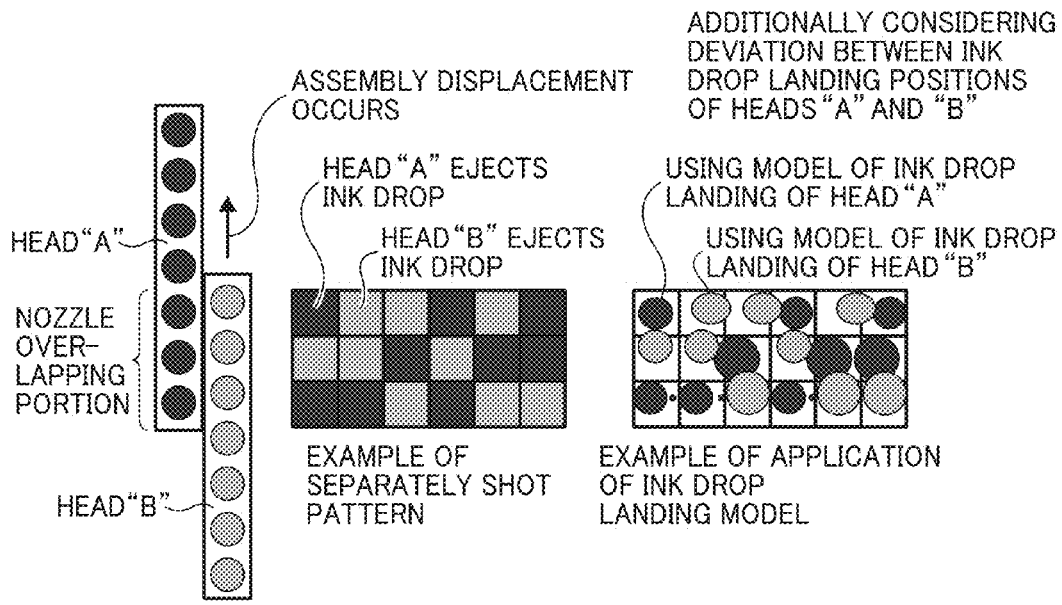
FIG. 20 is a diagram showing another situation when the printing head executes another overlapping process according to one embodiment of the present invention.

FIG. 20 illustrates a system employing the same separate ejection pattern as that illustrated in FIG. 19 but having a discrepancy between the heads A and B. A droplet landing model is applied together with location information related to the heads A and B in this situation again.

Further, a multiple scanning operation is sometimes executed in a serial printer. In such a multiple-scanning, ink is discharged several times at the same range while moving a carriage with a finer pitch than that between multiple nozzles 23 disposed on a printing head 21 thereby forming an image with finer resolution than the pitch of the nozzle 23.

Figure 21:
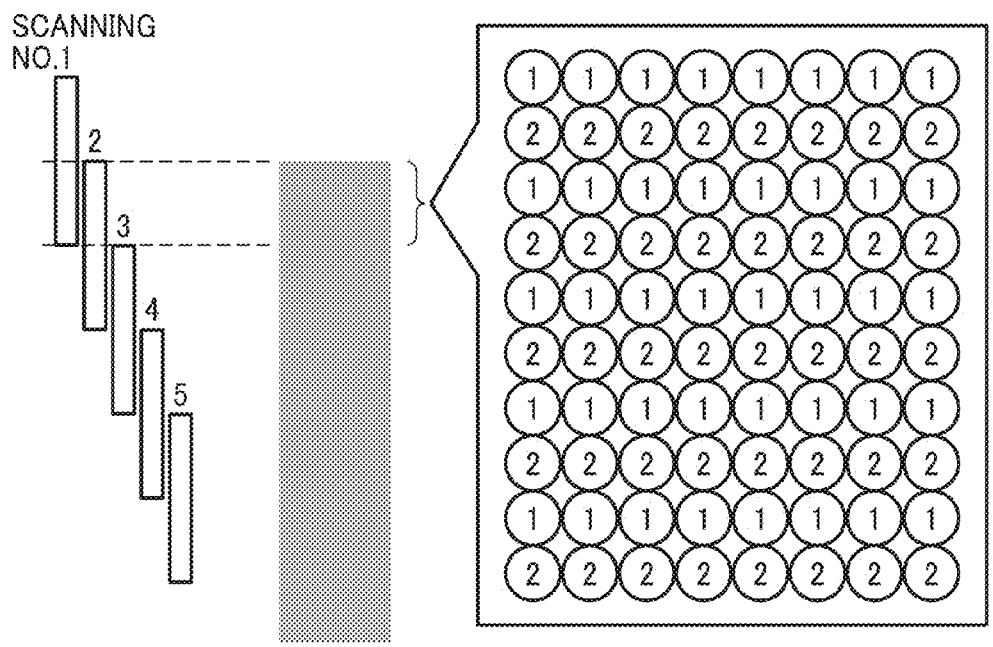
FIG. 21 is a diagram showing a situation when multiple scanning is executed according to one embodiment of the present invention.

FIG. 21 illustrates one example of a multiple scanning operation executed under conditions of single path and ½ interlace. In this situation, an image is separately formed by No. 1 and No. 2 scanning heads overlapping each other as shown in the drawing. Specifically, a nozzle responsible for discharging a dot is alternated such that a nozzle below the head operates in the first scanning and a nozzle above the head operates in the second scanning.

Figure 22:
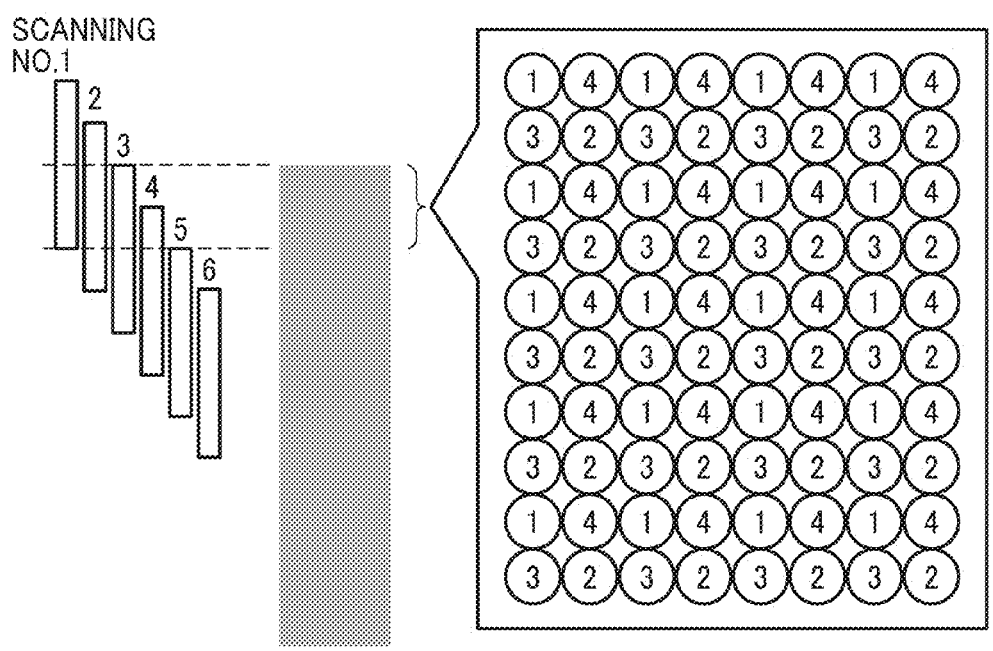
FIG. 22 is a diagram showing another situation when the multiple scanning is executed according to one embodiment of the present invention.

FIG. 22 illustrates another example of the multiple scanning operation executed under conditions of 2-pass and ½ interlace. In this situation, a dot is formed in a direction perpendicular to a lengthwise direction of the head and nozzles responsible for discharging a dot are placed on a two-dimensional plane. Accordingly, because a nozzle responsible for discharging a dot changes depending on a location of image data, a droplet landing model needs to match to the nozzle.

Figure 23:
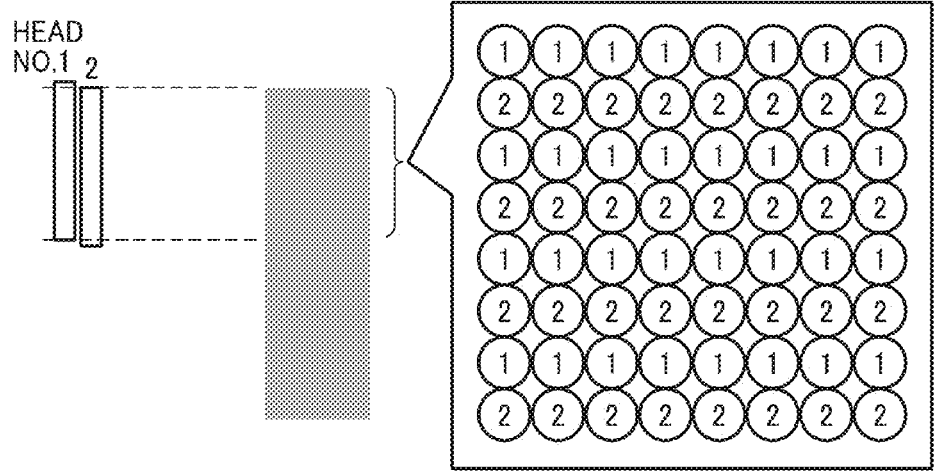
FIG. 23 is a diagram showing a situation when a multiple head operation is executed according to one embodiment of the present invention.
Figure 24:
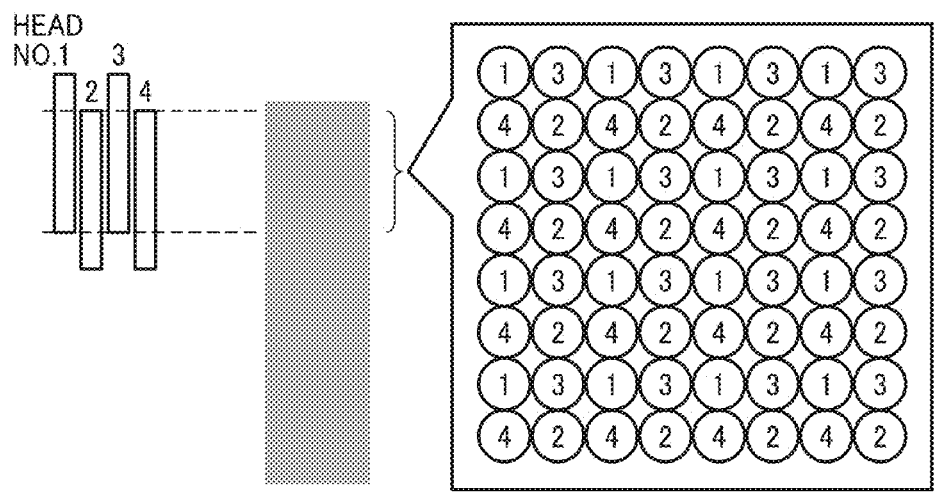
FIG. 24 is a diagram showing another situation when the multiple head operation is executed according to another embodiment of the present invention.

Further, a similar system to that described above is sometimes applied to the multiple-head. For example, a system shown in FIGS. 23 and 24 is intended to obtain the similar effect as obtained by interlace and a multiple path by utilizing multiple heads. Yet further, a multiple scanning is sometimes conducted using the head unit having this like configuration.

Figure 25:
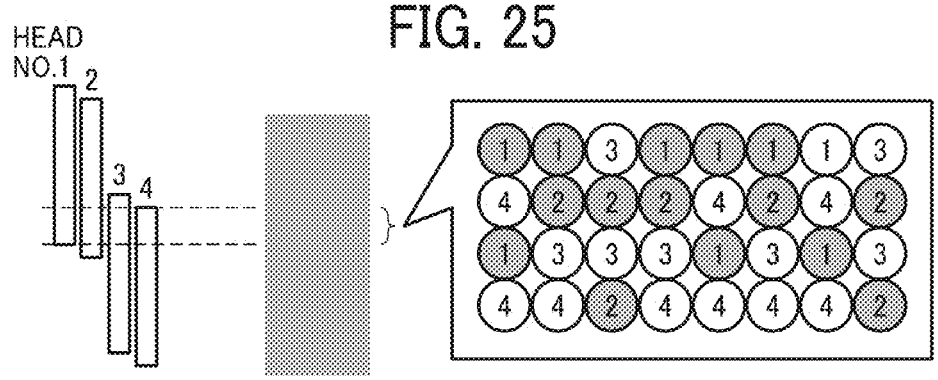
FIG. 25 is a diagram showing yet another situation when the multiple head operation is executed according to one embodiment of the present invention.

Further, FIG. 25 illustrates a system in which a combination of an assembly head and an overlapping process are used. In the drawing, at the overlapping portion, dots are formed by combining from No. 1 to No. 4 heads. However, a nozzle responsible for discharging a dot needs to match to a droplet landing model again.

Furthermore, because positional deviation occurs dynamically between two scanning operations during multiple scanning, it is difficult to predict this discrepancy. However, because a positional relation between nozzles is fixed at a portion where the heads are assembled, a mutual positional relation is readily obtained and taken in the droplet landing model when an image pattern as shown in FIGS. 10B, 10C, and 11 is printed.

According to the present invention, an image can be formed by an engine in accordance with the performance of the engine without deteriorating image quality.

Numerous additional modifications and variations of the present invention are possible in light of the above teachings. It is therefore to be understood that within the scope of the appended claims, the present invention may be practiced otherwise than as specifically described herein.

What is claimed is:

1. An image processing method for an image forming apparatus having a nozzle for ejecting an ink droplet onto a printing medium, comprising the steps of:
   obtaining an original image;
   storing the original image in a storage medium;
   converting a gradation of a pixel constituting the original image stored in the storage medium in at least two different manners to generate converted original images be expressed by the image forming apparatus;
   outputting a dot pattern image through the nozzle of the image forming apparatus based on a predetermined dot pattern signal;
   generating nozzle characteristic information indicating a characteristic of the nozzle based on the dot pattern image;
   outputting at least two sets of simulation information based on the converted original images and the nozzle characteristic information;
   storing the at least two sets of simulation information in a storage medium;
   generating converted simulation information by converting gradation of a pixel of the at least two sets of the simulation information to the same level as the original image;
   comparing the at least two sets of the converted simulation information with the original image;
   calculating a conversion error between the original image and the at least two sets of the converted simulation information;
   storing the conversion error in a storage medium; and
   specifying one of the converted original images as drawing information based on the conversion error to cause the image forming apparatus to form the image by ejecting an ink droplet.

2. The image processing method as claimed in claim 1, wherein the step of generating nozzle characteristic information is executed by comparing the prescribed dot pattern signal with the dot pattern image information stored in the memory.

3. The image processing method as claimed in claim 2, wherein the step of storing the at least two sets of simulation information in a storage medium is executed when a difference between currently and previously generated nozzle characteristic information exceeds a given threshold.

4. The image processing method as claimed in claim 1, wherein the nozzle characteristic information includes at least one of a position of an ink droplet, a size of the ink droplet, a shape of the ink droplet, and distribution of a plurality of ink droplets ejected onto the printing medium from the nozzle based on the drawing information per pixel.

5. The image processing method as claimed in claim 4,
   wherein each of the at least two sets of simulation information includes distribution of a plurality of ink droplets outputted based on the converted pixel gradation,
   wherein gradation of a pixel of the simulation information is calculated based on an ink covering amount per pixel with reference to the ink distribution information when converted into the same gradation level as the original image.

6. The image processing method as claimed in claim 1, wherein the nozzle characteristic information includes a variable operating condition of the image forming apparatus.

7. The image processing method as claimed in claim 1, wherein all of the steps are executed per divisional region of the original image.

8. The image processing method as claimed in claim 7, further comprising the steps of:
   assigning a priority order to the divisional regions;
   calculating the conversion error in the priority order assigned to the divisional regions;
   determining the drawing information for one of the divisional regions based on a result of the conversion error calculation; and
   determining drawing information for another region adjacent to the one of the divisional regions with reference to a result of the simulation executed for the one of the divisional regions.

9. A non-transitory computer readable medium storing thereon program code causing a computer to perform the steps of:
   obtaining an original image;
   storing the original image in a storage medium;
   converting a gradation of a pixel constituting the original image stored in the storage medium in at least two different manners to generate converted original images be expressed by the image forming apparatus;
   outputting a dot pattern image through a nozzle of the image forming apparatus based on a predetermined dot pattern signal;
   generating nozzle characteristic information indicating a characteristic of the nozzle based on the dot pattern image;
   outputting at least two sets of simulation information based on the converted original images and the nozzle characteristic information;
   storing the at least two sets of simulation information in a storage medium;
   generating converted simulation information by converting gradation of a pixel of the at least two sets of the simulation information to the same level as the original image;
   comparing the at least two sets of the converted simulation information with the original image;
   calculating a conversion error between the original image and the at least two sets of the converted simulation information;
   storing the conversion error in a storage medium; and
   specifying one of the converted original images as drawing information based on the conversion error to cause the image forming apparatus to form the image by ejecting an ink droplet.

10. The medium as claimed in claim 9, wherein the step of generating nozzle characteristic information is executed by comparing the prescribed dot pattern signal with the dot pattern image information stored in the memory.

11. The medium as claimed in claim 10, wherein the step of storing the simulation information in a storage medium is executed when a difference between currently and previously generated nozzle characteristic information exceeds a given threshold.

12. The medium as claimed in claim 9, wherein the nozzle characteristic information includes at least one of a position of an ink droplet, a size of the ink droplet, a shape of the ink droplet, and distribution of a plurality of ink droplets ejected onto the printing medium from the nozzle based on the drawing information per pixel.

13. The medium as claimed in claim 12,
   wherein the simulation information includes distribution of a plurality of ink droplets outputted based on the converted pixel gradation,
   wherein pixel gradation of the simulation information is calculated in accordance with an ink covering amount per pixel based on the ink distribution information when converted to the same level as the original image.

14. The medium as claimed in claim 9, wherein the nozzle characteristic information includes a variable operating condition of the image forming apparatus.

15. The medium as claimed in claim 9, wherein all of the steps are executed per divisional region of the original image.

16. The medium as claimed in claim 15, further comprising the steps of:
assigning a priority order to the divisional regions;
calculating the conversion error in the priority order assigned to the divisional regions;
determining the drawing information for one of the divisional regions based on a result of the conversion error calculation; and
determining drawing information for another region adjacent to the one of the divisional regions with reference to a result of the simulation executed for the one of the divisional regions.

17. An information processing apparatus comprising:
means for obtaining an original image;
means for storing the original image in a storage medium;
means for converting a gradation of a pixel constituting the original image stored in the storage medium in at least two different manners to generate converted original images be expressed (expressible) by the image forming apparatus;
means for outputting a dot pattern image through a nozzle of the image forming apparatus based on a predetermined dot pattern signal;
means for generating nozzle characteristic information indicating a characteristic of the nozzle based on the dot pattern image;
means for outputting at least two sets of simulation information based on the converted original images and the nozzle characteristic information;
means for storing the at least two sets of simulation information in a storage medium;
means for generating converted simulation information by converting gradation of a pixel of the at least two sets of the simulation information to the same level as the original image;
means for comparing the at least two sets of the converted simulation information with the original image;
means for calculating a conversion error between the original image and the at least two sets of the converted simulation information;
means for storing the conversion error in a storage medium; and
means for specifying one of the converted original images as drawing information based on the conversion error to cause the image forming apparatus to form the image by ejecting an ink droplet.

18. The image processing apparatus as claimed in claim 17, wherein the step of generating nozzle characteristic information is executed by comparing the prescribed dot pattern signal with the dot pattern image information stored in the memory.

19. The image processing apparatus as claimed in claim 18, wherein the step of storing the simulation information in a storage medium is executed when a difference between currently and previously generated nozzle characteristic information exceeds a given threshold.

20. The image processing apparatus as claimed in claim 17,
wherein the nozzle characteristic information includes at least one of a position of an ink droplet, a size of the ink droplet, a shape of the ink droplet, and distribution of a plurality of ink droplets ejected onto the printing medium from the nozzle based on the drawing information per pixel,
wherein the nozzle characteristic information includes a variable operating condition of the image forming apparatus, and
wherein all of the steps are executed per divisional region of the original image.

* * * * *